United States Patent [19]

Masaki

[11] Patent Number: 4,547,800

[45] Date of Patent: Oct. 15, 1985

[54] POSITION DETECTING METHOD AND APPARATUS

[75] Inventor: Ichiro Masaki, Brookfield, Conn.

[73] Assignee: Unimation, Inc., Danbury, Conn.

[21] Appl. No.: 239,621

[22] Filed: Mar. 2, 1981

Related U.S. Application Data

[63] Continuation-in-part of Ser. No. 106,039, Dec. 21, 1979, abandoned.

[30] Foreign Application Priority Data

Dec. 25, 1978 [JP] Japan ................ 53-160464

[51] Int. Cl.⁴ .............................. H04M 7/18
[52] U.S. Cl. .................... 358/107; 358/101; 356/400; 382/30
[58] Field of Search ............... 358/93, 101, 106, 107, 358/105, 125, 126; 250/578; 356/400, 399; 364/559, 400, 474; 340/146.3 H, 146.3 Q; 382/30, 42

[56] References Cited

U.S. PATENT DOCUMENTS

| | | | |
|---|---|---|---|
| 3,104,369 | 9/1963 | Rabinow et al. | 340/146.3 |
| 3,492,646 | 1/1970 | Bene et al. | 340/146.3 |
| 3,532,807 | 10/1970 | Webb | 178/6 |
| 3,618,742 | 11/1971 | Blanchard | 198/33 AB |
| 3,644,889 | 2/1972 | Skenderoff et al. | 340/146.3 G |
| 3,710,323 | 1/1973 | Andrews et al. | 340/146.3 |
| 3,717,848 | 2/1973 | Irvin et al. | 340/146.3 |
| 3,727,183 | 4/1973 | LeMay | 340/146.3 |
| 3,760,357 | 9/1973 | Inose et al. | 340/146.3 |
| 3,766,355 | 10/1973 | Kottkamp | 219/121 EB |
| 3,801,775 | 4/1974 | Acker | 235/61.11 E |
| 3,803,553 | 4/1974 | Nakano et al. | 340/146.3 F |
| 3,811,110 | 5/1974 | Inose et al. | 340/146.3 |
| 3,815,090 | 6/1974 | Muenchhausen | 340/146.3 MA |
| 3,831,146 | 8/1974 | Rundle | 340/146.3 H |
| 3,840,739 | 10/1974 | Coulter | 250/202 |
| 3,845,466 | 10/1974 | Hong | 340/146.3 S |
| 3,852,573 | 12/1974 | Dolch | 235/61.11 E |
| 3,878,509 | 4/1975 | Kikuchi et al. | 340/146.3 |
| 3,883,848 | 5/1975 | Minck et al. | 340/146.3 H |
| 3,955,072 | 5/1976 | Johannsmeier et al. | 364/559 |
| 4,021,840 | 5/1977 | Ellsworth et al. | 358/101 |
| 4,079,416 | 3/1978 | Faani et al. | 358/106 |
| 4,148,061 | 4/1979 | Lemelson | 358/101 |
| 4,200,861 | 4/1980 | Hubach et al. | 382/30 |
| 4,203,132 | 5/1980 | Schmitt et al. | 358/101 |
| 4,212,031 | 7/1980 | Schmitt et al. | 364/474 |
| 4,233,625 | 11/1980 | Altman | 364/559 |
| 4,305,097 | 12/1981 | Doemens et al. | 358/101 |
| 4,334,241 | 6/1982 | Kashioka et al. | 382/8 |
| 4,352,125 | 9/1982 | Goth | 358/101 |

*Primary Examiner*—Michael A. Masinick
*Assistant Examiner*—Edward L. Coles
*Attorney, Agent, or Firm*—Fleit, Jacobson, Cohn & Price

[57] ABSTRACT

There is provided a method of detecting any positional deviation of a workpiece from a reference position with the aid of an image sensor. First, a sample workpiece is put at the predetermined position, and is detected by the image sensor to provide reference image information. Likewise, a workpiece under inspection is detected by the image sensor to provide workpiece image information. The reference information is subjected to a parallel transformation and/or rotation and is compared with the workpiece image which remains in the original state, to detect the correlation degree between the two sets of information. The detection of the correlation degree is repeated for each incremental parallel transformation and/or rotation of the reference information. The maximum correlation degree is selected from among the accumulated correlation degrees, whereby the positional deviation of the workpiece, if any, from the reference position is represented by the amount and the direction of the parallel transformation and/or rotation which give the maximum correlation degree.

70 Claims, 21 Drawing Figures

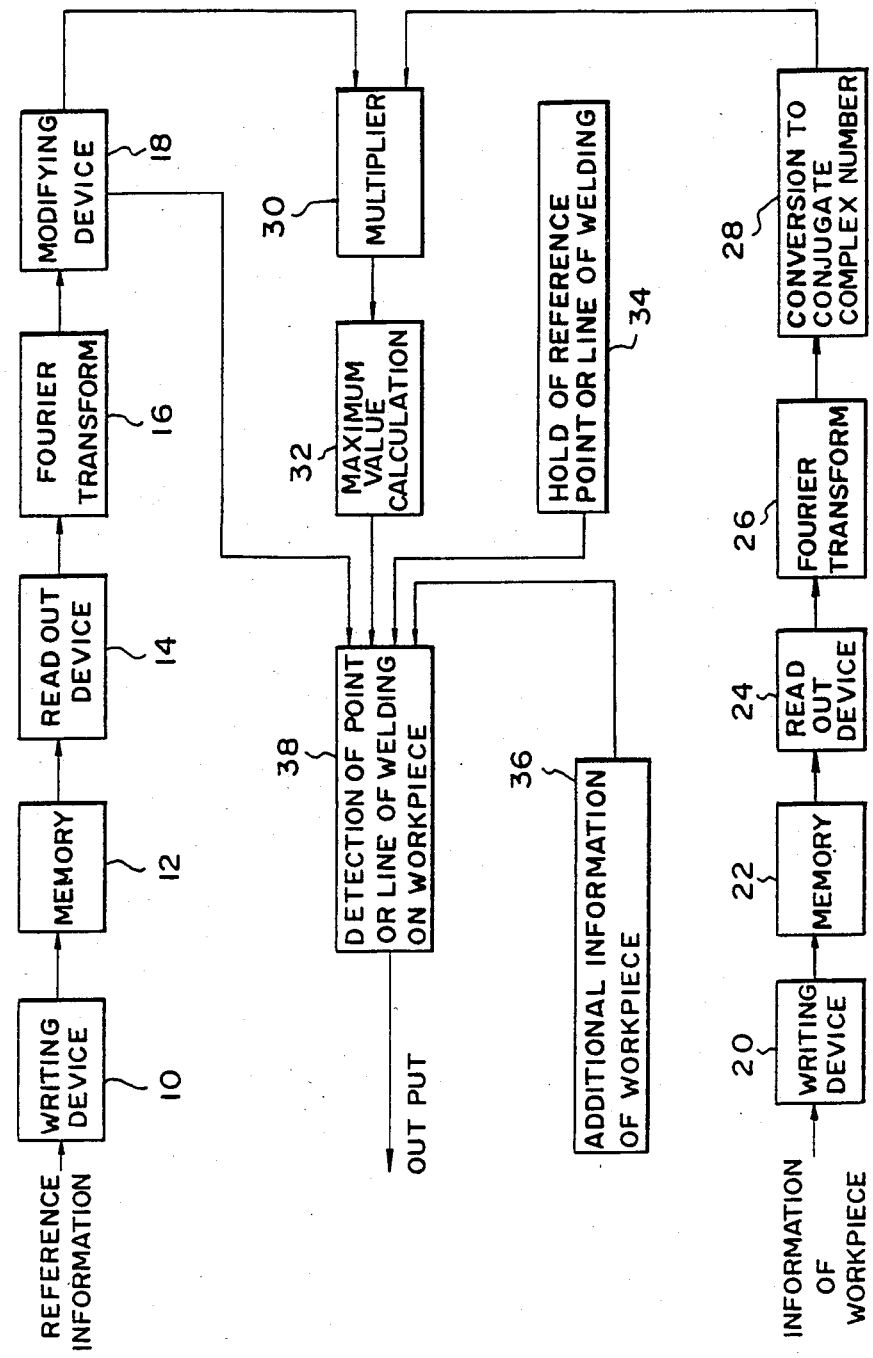

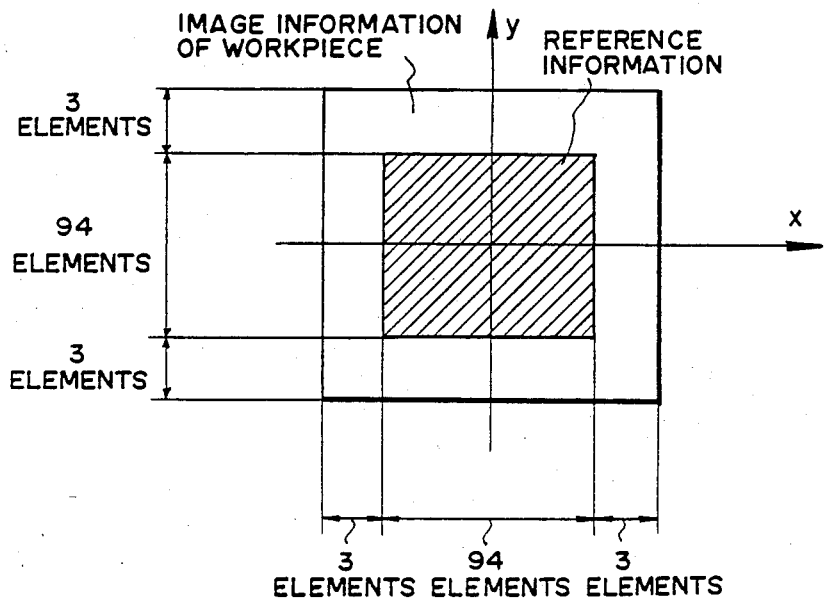

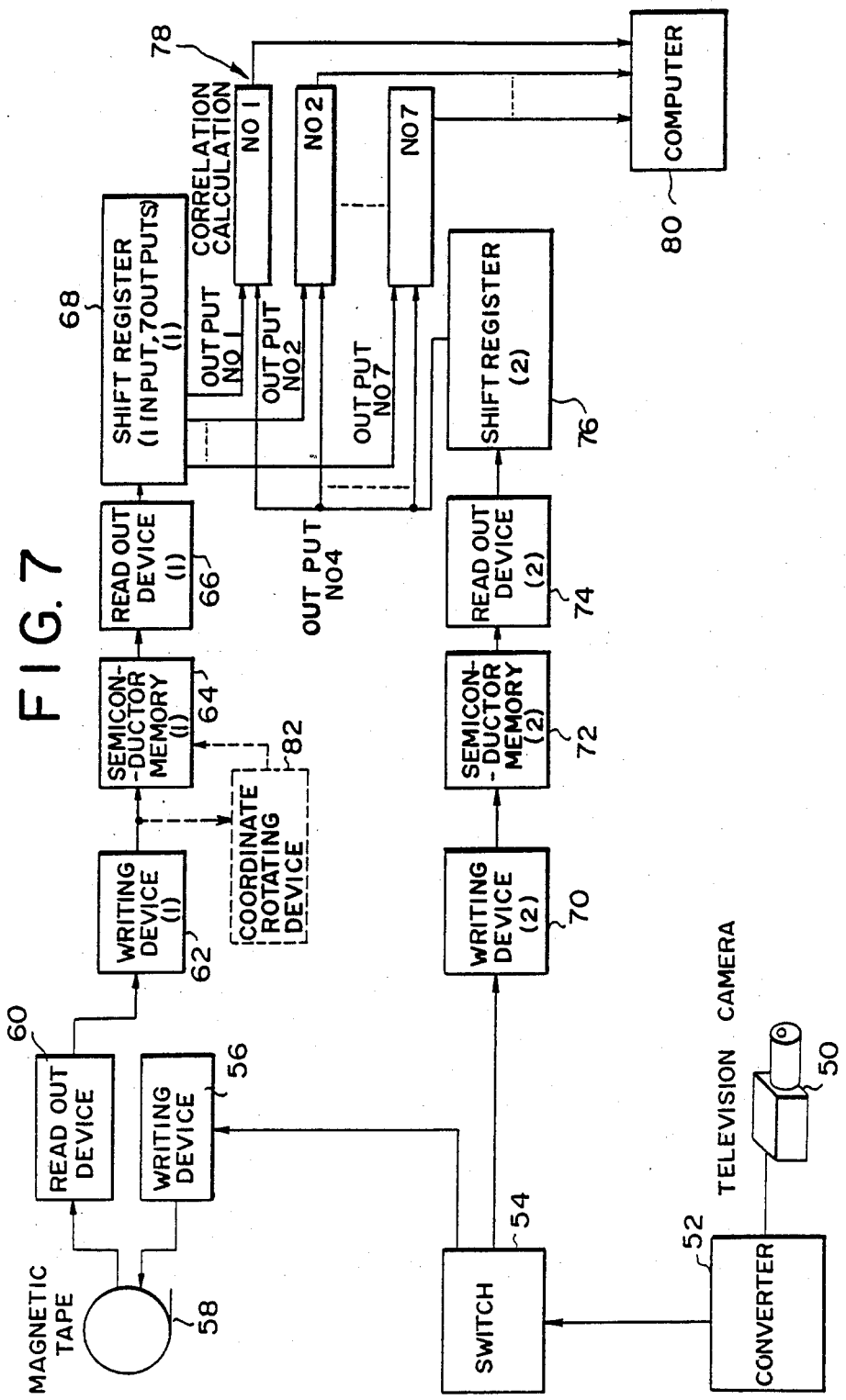

FIG. 11
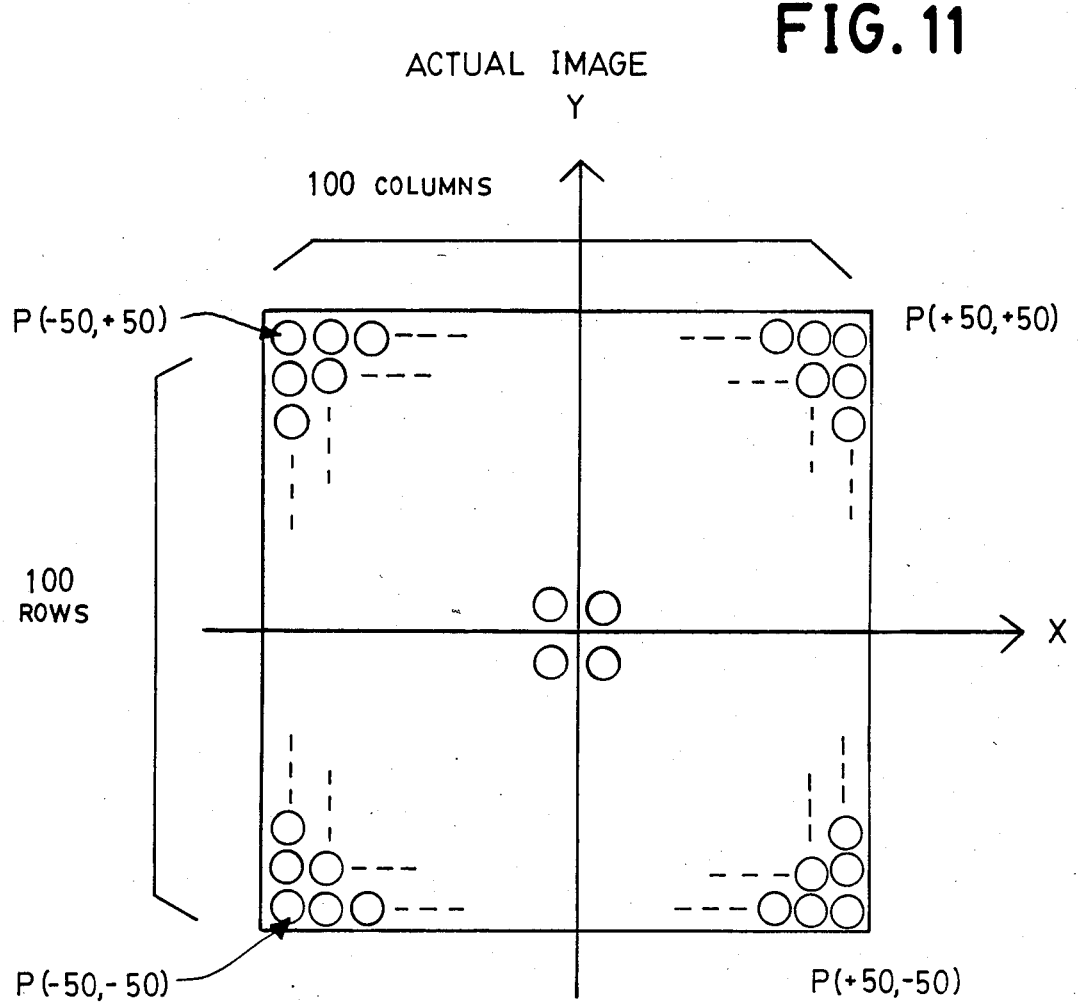
ACTUAL IMAGE
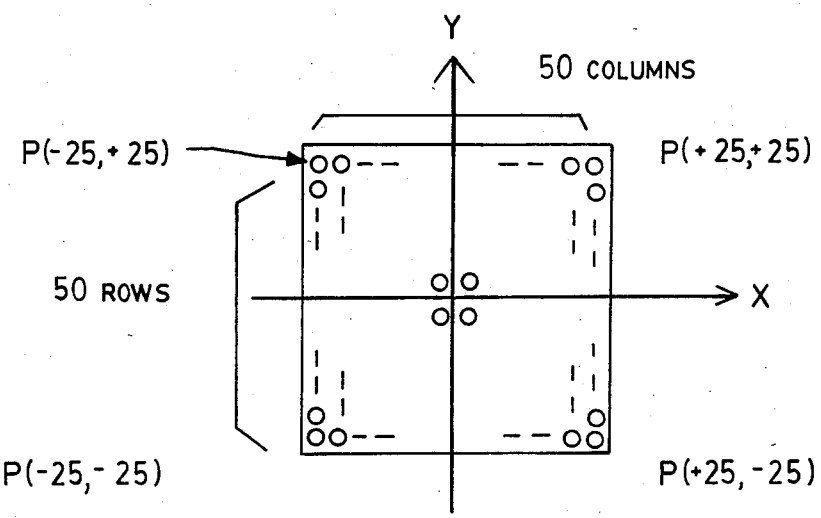
TEMPLATE REFERENCE IMAGE
FIG. 12

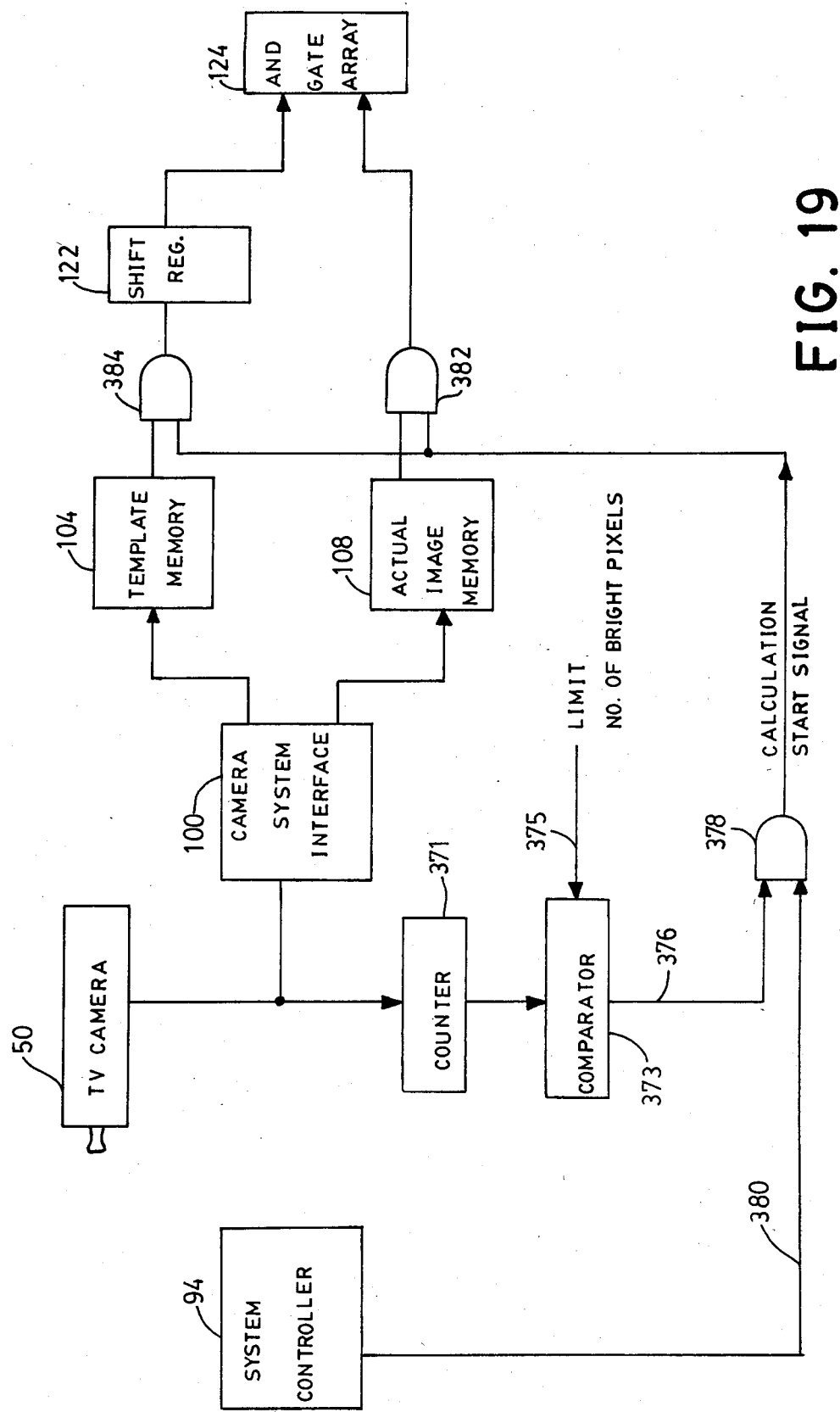

POSITION DETECTING METHOD AND APPARATUS

CROSS-REFERENCE TO RELATED APPLICATIONS

This application is a continuation-in-part application of application Ser. No. 106,039 filed Dec. 21, 1979 and now abandoned.

BACKGROUND OF THE INVENTION

1. Field of the Invention

This invention relates to a method for detecting the position of an object. Specifically, this invention relates to a method of detecting the geometric relationship between two or more abutting objects, and more specifically, to such a detecting method as is particularly useful in detecting a limit line which is defined by two or more workpieces to be welded with the aid of a two-dimensional image sensor such as a television camera.

2. Description of the Prior Art

It has been heretofore known to use the "light shearing method" and "line approximation" in detecting a boundary between adjoining workpieces to be welded with the aid of a two-dimensional image sensor. According to the "light shearing method", a slit light image is projected across the boundary or adjoining workpieces to be welded, and the two-dimensional image sensor detects the projected light image which is deformed so as to be in conformity with the particular geometric characteristic of the boundary. Thus, the signal from the image sensor represents the geometric characteristic of the boundary to be welded. In the case of a fillet welding to be effected along the boundary between two adjoining workpieces as shown in FIG. 1, for example, the boundary to be welded can be detected from a slit light image which is projected across the boundary and is deformed in the straight-and-bent line. The boundary is represented in terms of the deformation of the slit light image.

"Line approximation" is one of the known methods used for automatically detecting a boundary between two or more adjoining workpieces to be welded. This method uses a two-dimensional image sensor and the signal from the image sensor representing light images on the boundary are mathematically processed to provide mathematical expressions of the boundary. If this method is used in combination with the light shearing method, two lines constituting a V-shaped light image (FIG. 2) is treated so as to provide two mathematical approximations for the two straight lines. Then, the intersection point of the two straight lines is calculated from the two mathematical equations thus derived.

Derivation of the approximate equations of the two intersecting lines, however, requires a large amount of calculation. In this connection the speed required in a welding operation will not be obtainable unless an inhibitably expensive processing apparatus is used. In the case of lap welding as shown in FIG. 3, however, the "light shearing method" plus "line approximation" is useless in detecting the limit line to be welded. Because two parallel-and-offset straight line light image appears in place of a V-shaped light image as shown in FIG. 4, Thus, it is impossible to detect the boundary in terms of the intersections of the two straight lines.

Recently there have been a variety of arc welding robots for automatically welding a train of workpieces one after another. In operation a sample workpiece is put in a predetermined position with respect to a given point on line of reference, and the tip of a welding torch is first manually moved along limit lines to be welded on the sample workpiece without performing actual welding so that the movement of the torch tip to be performed during the subsequent actual welding operation is stored in a memory. Then, an actual welding operation is performed by automatically moving the welding torch tip in accordance with the stored movement pattern of the welding torch. In this automatic welding operation, however, even a slight positional deviation of a workpiece from the point or line of reference makes it impossible for the welding torch to precisely trace the limit line to be welded on the workpiece. For the purpose of solving this problem, it might be considered to detect any deviation of a workpiece from the positional standard by a two-dimensional image sensor and an image processor and to correct accordingly the programmed movement of the welding torch. In order to detect the positional deviation it might also be considered to utilize the aforementioned light shearing method plus line-approximation. However, this is not satisfactory because, as mentioned hereinbefore, it is useless in the case of lap welding.

U.S. Pat. No. 3,766,355 which issued to E. Kottkamp on Oct. 16, 1973 is directed to the optical detection of a welding spot produced by a radiant welding beam and to the optical detection of a welding joint. The joint detector includes equipment 78 to provide an image of the workpiece and joint and to provide signals representing the relative position of the joint in the image plane. The detector signal is used as a reference for the control of the relative position of the welding spot.

A satisfactory recourse to detect any positional deviation of a workpiece from the standard position with a two-dimensional image sensor is to convert the picture image of boundary outputted from the image sensor into a corresponding binary picture image and to compare it with a binary reference picture image.

In putting this idea into practice, it might be considered to utilize the "correlation detection" which is used in comparison or analysis of waveforms. According to the "correlation detection", original information is "mapped" or shifted to a mathematical domain different from the coordinate domain of the original information through the agency of Fourier transform or the like. The term "original information" used here means information or data outputted from a two-dimensional or one-dimensional image sensor and still not subjected to any processing. Incidentally, whatever processing it might be, it always accompany "mapping" of the original information onto a mathematical plane different from the domain of the original information. Specifically, the processing accompanies inhomogeneous mapping and/or homogeneous mapping. The inhomogeneous mapping means to shift the original information to a mathematical plane of which at least one coordinate axis represents a mathematical quantity not appearing on any of coordinates of the original information, whereas the homogeneous mapping means to shift the original information to a mathematical plane having essentially the same coordinate axes as those of the original information.

Assuming that a television camera is used as the two-dimensional image sensor, the original information is given in a coordinate plane including X-axis, Y-axis and analog lightness axis. The vertical and the horizontal positions and the lightness of each picture element are given in terms of coordinates named in the order. If the original information is subjected to Fourier transform, the transformed information is on a mathematical plane having a real component axis, an imaginary component axis and a lightness axis. This can be called "inhomogeneous mapping" because of the imaginary component foreign to the original information.

When the analog lightness of each picture element is converted into binary lightness so that the original information is given on a mathematical plane having an X-axis, a Y-axis and a binary lightness axis, this can be called "homogeneous mapping". Becaue the analog lightness of the original information and the binary lightness of the mapped information are given on real number axes. "Homogeneous mapping" other than the analog-to-binary conversion are parallel transformation of picture image, rotation of pictue image, noise elimination of picture image, and derivation of a basic pattern from a picture image.

FIG. 5 shows an example of a deviation detecting system according to the correlation detection utilizing mapping by Fourier transform. The system shown utilizes the light shearing method for detecting any positional deviation of an object from the reference position. First, a reference object such as a sample workpiece to be welded is put at a predetermined or reference position. A slit light image is projected onto a limit line of welding and the projected and deformed slit light image is sensed by a two-dimensional image sensor, which in turn output a corresponding image information, whose lightness information is then converted into binary lightness information. The partially converted picture image information is stored as reference information through a writing device 10 in a memory 12. In FIG. 5, the part of workpiece to be welded, the light pattern projecting device, the two-dimensional image sensor and the analog-to-binary converter are omitted for the sake of simplification. Thus, the image information is stored in the memory 12 is discrete form, constituting the reference information f (x, y) (information concerning lightness is omitted for simplification of explanation) and each discrete information for each element is read out by a reading device 14 to direct to a Fourier transform device 16. The Fourier transform device 16 converts the received information f (x, y) into Fourier transformed information F (u, v), which is in turn fed to a modifying device 18. The information f (x, y) and the transformed information F (u, v) are in the following relation:

$$F(u, v) = \frac{1}{N} \sum_{x=o}^{N-1} \sum_{y=o}^{N-1} f(x, y)\exp[-j2\pi(ux + vy)/N]$$

where x, y, u, v = 0, 1, 2, ... N−2, N−1

The modifying device 18 performs an operation on the information which operation causes the same effect as parallel transformation rotation of the information f (x, y) would have been performed in the x-y before shifting to the U-V plane. Specifically, the operation performed transformed information F (u, v) has the following meaning for the information f (x, y):

$$F(u, v)\exp[-j2\pi(ux_o + vy_o)/N] \Longleftrightarrow f(x - x_o, y - y_o)$$

-continued
$$F(w, \phi + \theta_o) \Longleftrightarrow f(r, \theta + \theta_o)$$

were
x = r co $\theta$, y = r sin $\theta$
u = w co $\theta$, v = w sin $\phi$

In calculating the correlation between the reference information and the information of a workpiece under inspection if there should be little angular deviation of the workpiece with regard to the reference position it suffices that the parallel transformation of information is performed irrespective of the rotational relation between the two sets of information. Then, the operation of F (u, v) corresponding in effect to the rotational operation of f (x, y) is omitted. In this case, if the information of a workpiece under inspection and the reference information somewhat deviate from each other in a rotational direction, no real maximum value of the correlation degree will not result from the parallel transformation only. In such a case, it is preferable to subject one of the two sets of information to a process equivalent to widening each of the two intersecting lines of the slit light image as shown in FIG. 6A. A broadening device may be incorporated in the writing device 10 or the reading device 14. In case that the slit light image is too broad to provide a maximum value clearly discernible from the neighboring values of the correlation degree, no reliable detections is possible. In this case, it is preferable to subject one of the two sets of information to a process equivalent to making fine each of the two intersecting lines of the slit light image, as shown in FIG. 6B.

Information concerning the position of a workpiece is collected in a manner similar to collection of the reference information. Specifically a slit light image is casted onto a workpiece to be subjected to a welding operation, and a projected slit light image which varies with the positional deviation of the wrokpiece from the reference position is sensed by the two-dimensional image sensor. After partially converted into binary information, the picture image information from the image sensor is stored through a writing device 20 into a memory 22 in the form of discrete image information g (x, y). The information g (x, y) is read by a reading device 24 and is directed to a Fourier transform device 26, where the information g (x, y) is converted to a Fourier transformed information G (u, v).

$$G(u, v) = \frac{1}{N} \sum_{x=o}^{N-1} \sum_{y=o}^{N-1} g(x, y)\exp[-j2\pi(ux + vy)/N],$$

where x, y, u, v = 0, 1, 2 ... N−2, N−1

A conjugate complex number computing device 28 converts the information G (u, v) into another kind of information G* (u, v), which is in conjugate complex number relation with G (u, v).

A multiplying device 30 performs the multiplication of the reference information F (u, v) by the positional information G* (u, v) so that the correlation C is derived. This is mathematically expressed by:

$$C = F(u, v) \cdot G*(u, v)$$

Again can be expressed in the x-y domain by:

$$C = f(x, y) \boxed{C} g(x, y),$$

where C is the correlation operator.

For determining the amount of deviation between the two kinds of information f (x, y) and g (x, y) it is necessary to substitute all possible different numbers for xo and yo in the following mathematical expression and to find the numbers for xo and yo which give the maximum correlation degree.

$$C = f(x-x_o, y-y_o) \boxed{C} g(x, y)$$

For carrying out this cutting-and-trying arithmetic operation in the U-V domain a maximum value computing device 32 is used to find out the values of xo and yo giving the maximum value according to the following equation:

$$C(x_o, y_o) = F(u, v) \exp[-j2\pi(uxo+vyo)/N]G^*(u, v)$$

From the output of the maximum value computing device 32 the relative position of the workpiece with respect to the reference position can be recognized. In FIG. 5 there are means 34 for selectively holding and supplying the information of the limit line of welding in the reference information, means 36 for holding and supplying the information concerning the position and attitude of the two-dimensional image sensor with respect to a given reference, and means 38 responsive to signals from different means 18, 32, 34 and 36 for determining the amount of deviation of the limit line of welding on the workpiece from a reference position on which the limit line of welding should be positioned.

The aforementioned correlation finding-out through the agency of Fourier transform guarantees very high accuracy. However, it disadvantageously requies too large amount of calculation to permit the real time finding-out even with the aid of a fast Fourier transform (FFT) device.

SUMMARY OF THE INVENTION

Accordingly, one object of this invention is to provide new method and apparatus for detecting any positional deviation of an object from a reference position with sufficient accuracy and speed.

It is another object of the present invention to provide a method and apparatus for detecting the positional deviation of an object from a reference position by comparing an actual image of the object with a reference image picture element by picture element, obtaining the deviation by determining the maximum correlation between various shifted positions of the actual image relative to the reference image, representing the deviation determination for a predetermined number of actual images and the reference image, and selecting the median deviation value of the deviations.

It is a further object of the present invention to provide a method and apparatus for detecting the positional deviation between an object and a reference position by comparing an actual image of the object with a reference image, obtaining the deviation in a first coarse shifting mode by detecting the maximum correlation between various shifted position of the actual image relative to the reference image throughout the full range of possible shifted positions between the images and obtaining the deviation in a second fine shifting mode by detecting the maximum correlation between various shifted positions of the actual image relative to the reference image over the range of possible shifted positions between the two adjacent coarse shifted positions on either side of the coarse position corresponding to the deviation determined in the first coarse shifting mode.

It is yet another object of the present invention to provide a method and apparatus in a position deviation detecting system for detecting the validity of an actual image of an object by comparing the total number of pixel elements in the actual image that are of a predetermined binary intensity with a limit number of pixel elements, the limit number being determined on the basis of a reference image or a known valid actual image.

According to this invention there is provided a method of detecting any positional deviation of an object from a reference position with the aid of an image sensor, which method comprises the steps of preparing reference image information; obtaining image information of the object by means of the image sensor; subjecting one of said two sets of information to a parallel transformation and/or rotation to detect the correlation degree between said two sets of information; and repeatedly detecting the correlation degree for each incremental parallel transformation and/or rotation until the possible maximum correlation degree has been obtained, whereby the positional deviation of the object, if any, from the reference position is detected.

In a preferred embodiment according to this invention the positional deviation of each of a train of workpieces, if any, from a reference position is detected with the aid of an image sensor. Specifically, a first or sample workpiece is put at a predetermined position with respect to a given point or line of reference, and is subjected to inspection by a two-dimensional image sensor such as a television camera to provide reference information which comprises a plurality of information bits. The reference information is converted to a corresponding binary information, and is stored. Likewise, a second or subsequent workpiece is subjected to inspection by the image sensor to provide information of second or subsequent workpiece, which information comprises a plurality of information bits, too. The information of second or subsequent workpiece is converted into corresponding binary information. One of said two sets of information is subjected to parallel transformation and/or rotation. (The "inhomogeneous" mapping as required in Fourier Transform in FIG. 5 is omitted). One set of information thus treated is compared bit by bit with the other set of information which remains in the original state. Then, the positionally corresponding bits which are in the same condition in the two sets of information are selected and counted. The counting is repeated for each incremental parallel transformation and/or rotation, whereby positional deviation of second or subsequent objects, if any, is detected.

In a particular mode of working the invention, not limitative, a television camera is used as two-dimensional image sensor, and two sets of information each comprises a plurality of black-and-white picture elements. The binary reference image information is subjected to parallel transformation and/or rotation, and is compared with the binary image information of the workpiece under inspection to detect how many picture elements in the same coordinate positions are in the same optical condition (black and white). The counting of corresponding picture elements is performed for each incremental parallel transformation and/or rotation, and each number is stored. Then, the maximum number is selected to determine from which parallel transformation and/or rotation the maximum number results. The shifting amount of the so determined parallel transformation and/or rotation represents the amount of deviation of the workpiece from the reference position, and the direction opposite to the shifting direction corresponds to the direction of deviation of the workpiece from the reference position. An associated servo-control is responsive to the amount and direction of deviation thus determined for putting the welding torch of a welding robot in the correct position and movement along the limit of welding on the workpiece.

As referred to earlier the "inhomogeneous" mapping is not used, and therefore the present detecting system is less expensive, assuring a quick actuation appropriate for use in controlling an automatic welding robot which is capable of welding workpieces one after another in rapid succession.

BRIEF DESCRIPTION OF THE DRAWING

The above and other objects and advantages of this invention will become apparent from the following detailed explanation of embodiments of this invention with reference to the accompanying drawings, in which:

FIG. 5 is a block diagram of an example of the positional deviation detecting system utilizing Fourier transform;

FIG. 6 illustrates the broadening and fining of the image pattern;

FIG. 7 is a block diagram of an embodiment of the position detecting system utilizing the direct recognization of correlation according to this invention;

FIG. 8 illustrates the dimensions of the reference picture frame and the picture frame of the workpiece;

FIG. 11 is a diagrammatic representation of a specific example of an actual picture frame image useful in the discussion of a second embodiment of the present invention;

FIG. 12 is a diagrammatic repesentation of a specific example of a template reference picture frame image useful in the discussion of a second embodiment of the present invention;

FIG. 19 is a logic and block diagram representation of the position deviation detecting system of FIGS. 7 through 18 and illustrating additional arrangements to accomplish bright pixel checking operations.

DESCRIPTION OF THE PREFERRED EMBODIMENT

Figure 1:
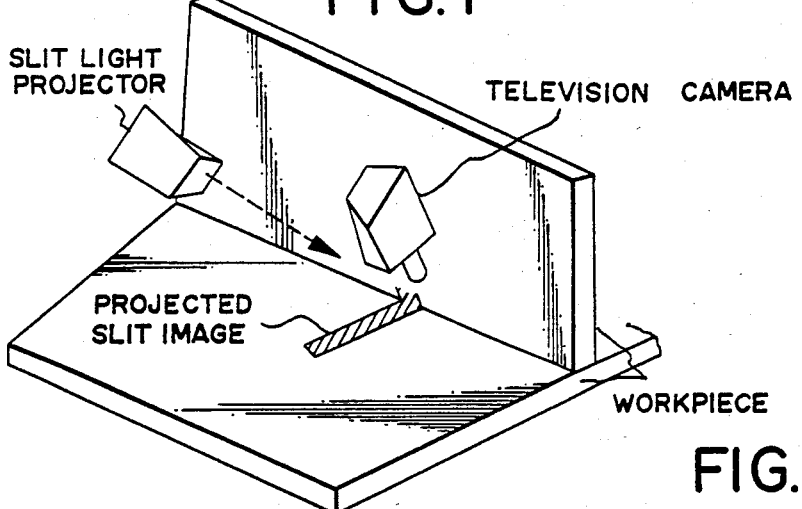
FIG. 1 is a diagrammatical perspective view of two abutting workpieces to be welded, on which a slit light is projected in accordance with the "light shearing method"
Figure 2:
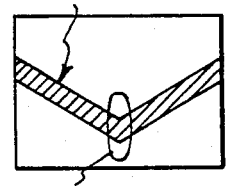
FIG. 2 is the image pattern of the slit light projected on the workpieces shown in FIG. 1.
Figure 3:
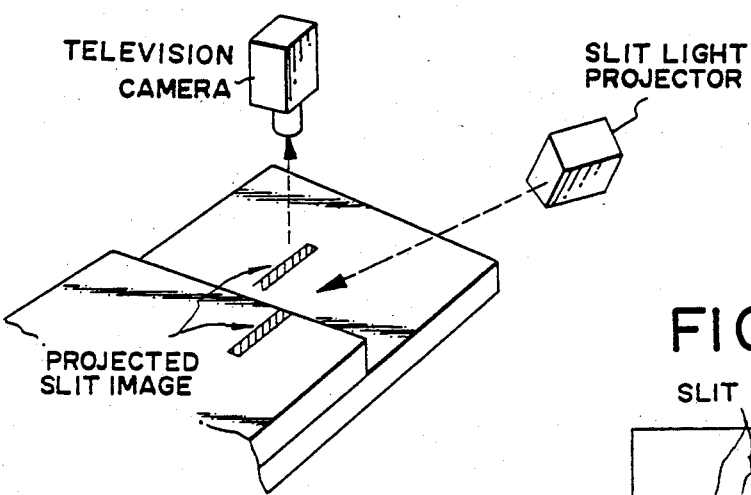
FIG. 3 is a diagrammatical perspective view of two lapped workpieces on which a slit light is projected in accordance with the the "light shearing method"
Figure 4:
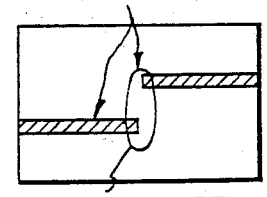
FIG. 4 is the image pattern of the slight light projected on the workpieces shown in FIG. 3.

Before describing the embodiment on the basis of this invention, the principle of this invention will be explained below with reference to the case of obtaining the correlation degree between the binary lightness of one picture element of an image of an object under inspection and the binary lightness of one picture element of a reference image in X-Y coordinate. Assume that lightness information Ia (x, y) represents the lightness of one picture element taking the position x on the X-axis and the position y on the Y-axis in the binary image information of the object under inspection whereas lightness information It (x+Sx, y+Sy) represents the lightness of one picture element taking the position X+Sx on the X-axis and the position y+Sy on the Y-axis in the binary reference image information. Also assuming that C (x, y, Sx, Sy) represents the correlation degree between the above mentioned two picture elements, the corelation operator C can be defined as follows.

Here, it should be noted that, in obtaining the correlation degree, comparison of magnitude is made between one information bit of one set of information and another information bit included in another set of information and corresponding in coordinate position to the one information bit of the one set of information. Referring to the above mentioned example, the binary image information of the object under inspection differs from the binary reference image information, and the first-mentioned picture element (x, y) of the binary image information of the object always positionally corresponds to the second-mentioned picture element (x+Sx, y+Sy) of the binary reference image information with the constant different of Sx on the X-axis and Sy on the Y-axis. The binary image information of the object is compared with the reference image information by performing logical operation between each pair of positionally corresponding picture elements of the two sets of information so as to give the correlation degree C (x, y, Sx, Sy).

EXAMPLE I OF DEFINITION OF $\boxed{C}$

In the Following equation:

$$C(x,y,Sx,Sy) = It\ (x+Sx,\ y+Sy)\ \boxed{C}\ Ia\ (x,y)$$

in the case of It $(x+Sx, y+Sy) = 1$ and Ia $(x,y) = 1$, $C(x,y,Sx,Sy)$ is defined to be equal to 1,
in the case of It $(X+Sx,y+Sy)=1$ and Ia $(x,y)=0$
$C(x,y,Sx,Sy)$ is defined to be equal to 0,
in the case of $It(x+Sx,y+Sy)=0$ and Ia $(x,y)=1$
$C(x,y,Sx,Sy)$ is defined to be equal to 0, and
in the case of It $(x+Sx, y+Sy)=0$ and Ia $(x,y)=0$
$C(x,y,Sx,Sy)$ is defined to be equal to 0.

In the above definition, "1" represents that the picture element concerned is a light point, whereas "0" represents that the picture element concerned is a dark point. Therefore, according to the definition of EXAMPLE I, if two picture elements to be compared with each other are light points, the correlation degree therebetween will be 1, and on the other hand, if only one of the two picture elements is a light point or if neither of the two picture elements is a light point, the correlation degree will be 0. In other words, the correlation degree is determined on the basis of only light point in the definition of EXAMPLE I.

EXAMPLE II

In the following equation:

$$C(x, y, Sx, Sy) = It(x+Sx, y+Sy) \boxed{C} Ia(x,y)$$

in the case of It $(x+Sx, y+Sy)+1$ and Ia $(x, y)=1$,
$C(x, y, Sx, Sy)$ is defined to be equal to 1,
in the case of It $(x+Sx, y+Sy)=1$ and Ia $(x, y)=0$,
$C(x, y, Sx, Sy)$ is defined to be equal to 0,
in the case of It $(x+Sx, y+Sy)=0$ and Ia $(x, y)=1$,
$C(x, y, Sx, Sy)$ is defined to be equal to 0, and
in the case of It $(x+Sx, y+Sy)=0$ and Ia $(x, y)=0$
$C(x, y, Sx, Sy)$ is defined to be equal to 1, According to the above definition, the correlation degree is determined on the basis of light point and dark point. However, the correlation degree can be determined on the basis of only dark point. In such a case, the correlation operation is defined as follows:

EXAMPLE III

In the following equation:
$C(x, y, Sx, Sy) = It(x+Sx, y+Sy) \boxed{C} Ia(x, y)$ in the case of It $(x+Sx, y+Sy)=1$ and Ia $(x, y)=1$,
$C(x, y, Sx, Sy)$ is defined to be equal to 0,
in the case of It $(x+Sx, y+Sy)=1$ and Ia $(x, y)=0$,
$C(x, y, Sx, Sy)$ is defined to be equal to 0,
in the case of It $(x+Sx, y+Sy)=0$ and Ia $(x, y)=1$,
$C(x, y, Sx, Sy)$ is defined to be equal to 0, and
in the case of It $(x+Sx, y+Sy)=0$ and Ia $(x, y)=0$
$C(x, y, Sx, Sy)$ is defined to be equal to 1.

All the expressions in the above mentioned definition can be expressed by the following generalized expression:

$$C(x, y, Sx, Sy) = V_{1,m}$$

where It $(x+Sx, y+Sy) = L_1$ $$Ia(x, y) = L_m$$

$L_1$ is the lightness of the picture element $(x+Sx, y+Sy)$ in the reference image information, and $L_m$ is the lightness of the picture element $(x,y)$ in the object image information.

According to the generalized expression, the correlation degree can be determined not only with regard to binary lightness information but also with regard to ternary, quaternary, quinary or higher order lightness information.

In the three aforementioned kinds of definition, the correlation degree f $(x, y, Sx, Sy)$ represents the correlation between each pair of positionally corresponding picture elements. Therefore, the correlation $C_f$ between a pair of complete picture frames can be expressed as follows:

$$C_f = \sum_{x=0}^{Nx} \sum_{y=0}^{Ny} W(x, y, Sx, Sy) \cdot C(x, y, Sx, Sy)$$

where Nx is the number of picture elements on the X-axis
Ny is the number of picture elements on the Y-axis
W $(x, y, Sx, Sy)$ is a weight function.

Assuming that the weight function W $(x, y, Sx, Sy)$ is always 1, the above equation can be simplified as follows:

$$C_f = \sum_{x=0}^{Nx} \sum_{y=0}^{Ny} C(x, y, Sx, Sy) \quad (1)$$

According to this equation, the correlation $C_f$ between a pair of complete picture frames will be represented by the mere sum of the correlation degrees C between all positionally corresponding picture element pairs.

FIG. 7 is a block diagram of a position detecting system according to this invention, which utilizes the equation (1) for obtaining the correlation degree. The system shown comprises a two-dimensional image sensor such as an industrial television camera 50 for detecting a reference object such as a sample workpiece put at a reference position and an object under inspection such as a workpiece which may deviate from the reference position or may have an error in size from the sample workpiece. The sample workpiece and the workpiece under inspection are illuminated by the aforementioned light shearing method. The output of the television camera 50 is connected to a converter 52 where the picture image information is converted into binary image information for each picture element. When the television camera 50 detects the sample workpiece put at the reference position, the output from the converter 52 is fed as binary reference image information through a switch 54 to a writing device 56 and then is stored in a memory such as a magnetic tape memory 58 by the agency of the writing device 56. On the other hand, when the television camera 50 detects the workpiece under inspection, the output of the converter 52 is supplied as binary workpiece image information through the switch 54 to another writing device 70 and is then stored in a memory such as a semiconductor memory 72 by means of the writing device 70. In this time, additional information such as information of the reference information corresponding to the center position of the workpiece and the relative position of the television camera with respect of the point or line of reference may be written in the magnetic tape memory.

When the position of the workpiece under inspection is detected, the reference information of one picture frame is read out from the magnetic tape memory 58 by means of a reading device 60 and is stored in a semiconductor memory 64 by the agency of a writing device 62. For example, when the welding is performed for different portions of each workpiece, the semiconductor memory 64 is updated and reference information of subsequent picture frame stored in the magnetic tape memory 58 is read out and stored, for example, for each portion to be welded of the workpiece. The reference information stored in the semiconductor memory 64 is read out by a reading device 66 and is fed to a seven stage shift register 68 having one input and seven outputs so that the reference information read out in series form is converted into a parallel form. First to seven outputs of the shift register 68 are respectively connected to a first input of seven correlation calculating devices 78.

On the other hand, the writing device 70 receives the image information of the workpiece under inspection through the switch 54 from the television camera 50 and acts to store the information of one picture frame in the semiconductor memory 72. The information of the workpiece stored in the memory 72 is read out by a reading device 74 and is supplied to a one-input and one-output shaft register 76 whose output is connected to a second input of each of the seven correlation calculating devices 78.

With a view to improving the accuracy in detecting any deviation of a workpiece from the reference position, the system shown in FIG. 7 uses a small-sized frame of reference information which is laid on an original sized frame of information of the workpiece under inspection.

In the course of detection the X-Y coordinates of the reference information is parallel-shifted by an incremental distance to find the shifting amount of the parallel transformation which gives the maximum correlation degree. Assuming that the original size of frame is as large as $100 \times 100$ picture elements, and that the two original-sized frames each bearing the reference information and the information of the workpiece under inspection are laid on each other, these frames when subjected to incremental shifting, will be brought in the offset condition, leaving marginal portions therearound. These marginal portions which vary in size with each incremental shifting will be a cause for lowering the accuracy with which deviation of the workpiece is determined, and the error caused thereby will increase with the size of the marginal portions. The remedy, therefore, is to maintain the size of the marginal portions at a given constant value irrespective of the incremental shiftings. Specifically, the frame of the reference information is reduced by predetermined maximum amounts of Sx and Sy on the X- and Y-axis respectively, thus leaving a constant area of marginal portions for each incremental shifting, and permitting all the resultant correlation degrees to be compared with each other on the same area of background.

Now assume that the original-sized frame bearing information contains $100 \times 100$ picture elements, and that the predetermined maximum amounts of Sx and Sy are as large as $\pm 20$ picture elements respectively. Then, the small-sized frame bearing the reference information is as large as $(100-40) \times (100-40)$ picture elements.

In the embodiment shown in FIG. 7, the original-sized frame bearing the information of the workpiece contains $100 \times 100$ picture elements, and the predetermined maximum amounts of Sx and Sy are as large as $\pm 3$ picture elements, respectively. Then, the small-sized frame bearing the reference information is as large as $(100-6) \times (100-6)$ picture elements. When the small-sized frame of reference information is laid on the original-sized frame of the information of the workpiece under inspection, constant area of marginal portion as large as 1164 picture elements are left and the correlation degrees for the incremental shiftings are compared with each other on the same area of background as large as 8836 picture elements. Thus, the error which otherwise would be caused by the varying areas of marginal portion can be reduced.

As is readily understood, the incremental shifting can be repeated as many times as the number of picture elements in the predetermined amount by which the frame of reference information is reduced. Assuming that the predetermined amount is set at $\pm 25$ picture elements in the X- and Y-directions, the incremental shifting can be repeated 2601 times, and the time required for detecting the maximum correlation degree is accordingly increased with the result that an associated automatic welder is controlled to work at a reduced speed unless the computations can be performed more rapidly.

In the embodiment of FIG. 7, the predetermined maximum amount of shifting is set at $\pm 3$ picture elements in the X- and Y-directions. Therefore, it is necessary to repeat the incremental shifting and hence the calculation of the correlation degree 49 times.

With a view of shortening the length of calculating time there are provided correlation degree calculating devices 78 of the same number as the number of incremental shiftings on the X-axis (i.e., the number of picture elements in the predetermined amount by which the frame is reduced) plus one (specifically seven), and a shift register 68 having stages as many as the correlation degree calculating devices (specifically seven stages). The output of each stage of the shift register 68 is connected to the first input of the corresponding correlation degree calculating devices 78. On the other hand, the workpiece information is fed to a seven stage shift register 76, and the output of the fourth stage of the register 76 is connected to the second input of each of the calculating device 78. Thus, the correlation degrees are simultaneously calculated for all the different incremental shiftings on the X-axis. With this arrangement the time required for calculating 49 correlation degrees can be reduced seven times by reading out the reference information from the memory 64 seven times each from the different starting points each apart from the preceding point by the corresponding amount to one picture element on the Y-axis, and at the same time by reading out the information of the workpiece under inspection from the memory 72 seven times.

The outputs of the seven correlation degree calculating devices 78 are fed to a computer 80 which temporarily stores 49 resultant correlation degrees to select the maximum correlation degree from among the 49 correlation degrees and to output the amounts of shift Sx and Sy which give the maximum correlation degree. The quantities $-Sx$ and $-Sy$ which are the same in amount but opposite in direction to the shift for maximum correlation degree represents the deviation of the workpiece from the reference position.

Figure 9A:
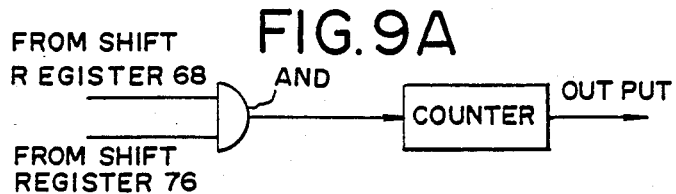
FIGS. 9A, 9B and 9C are circuit diagrams of different logic circuits which may be used to calculate the correlation degree.
Figure 9B:
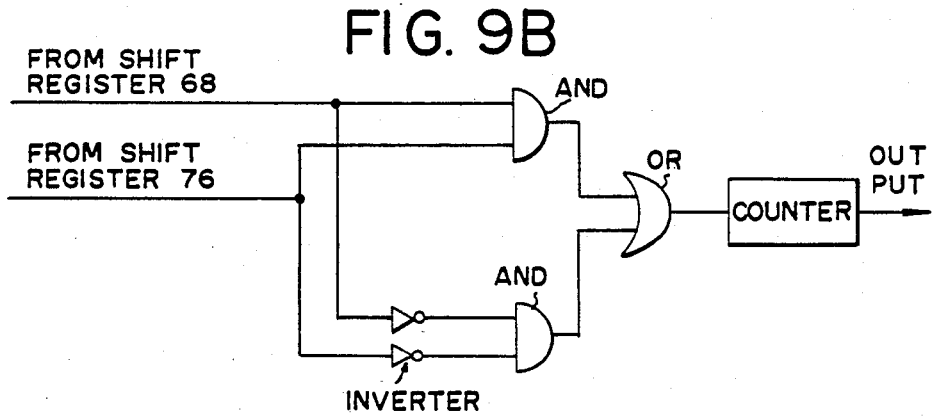
Figure 9C:
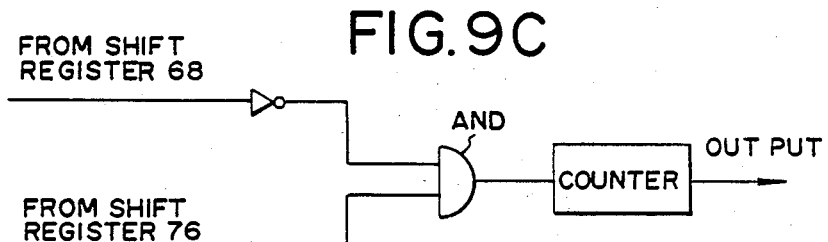

FIGS. 9A, 9B and 9C show circuit diagrams of the devices 78 which perform calculation of the correlation degree on the basis of the definitions in the aforementioned EXAMPLES I, II and III. The correlation device calculating device constructed to perform logical operation in accordance with the definition of EXAMPLE I comprises one two-input AND circuit and the counter connected as shown in FIG. 9A. The calculating device for logical operation on the basis of the definition of EXAMPLE II includes two inverters and two AND circuits and one counter connected as shown in FIG. 9B. The device for logical operation in accordance with EXAMPLE III consists of two inverters, one AND circuit and one counter connected as shown in FIG. 9C. The counter used in each correlation degree calculating device is adapted to count the correlation degrees between all positionally corresponding picture elements of a pair of complete picture frames.

In order to rotate the reference information with respect to the workpiece information, the system includes a coordinate rotating device 82 provided between the writing device 62 and the semiconductor memory 64 to rotate one frame of reference information fed from the writing device a predetermined number of degrees and to supply the reference information thus rotated to the semiconductor memory.

In the system shown in FIG. 7, the reference information supplied through the switch 54 is not directly fed to the semiconductor memory 64 as stored in the magnetic tape memory 58. In order to perform a continuous welding for different portions of each workpiece, it is necessary to store a large amount of reference information. Therefore, the magentic tape memory 58 is more inexpensive in cost per bit than the semiconductor memory and is used to decreaes the overall cost of the sytem. However, the read rate of the magnetic tape memory is low. Becaues of this, a large amount of reference information is stored in the magnetic tape memory 58 and only one frame of reference information stored in the tape memory 58 is read out and temporarily stored in the semiconductor memory 64 which is able to comply with a high read rate required by this system. Therefore, the semiconductor memory 64 is sufficient if it is able to store only one frame of information. If the write rate of the magnetic tape memory 58 cannot comply with the transmission rate of the binary reference image information supplied from the converter 52, it would be necessary to provide a buffer memory between the switch 54 and the writing device 56. In this case, the reference information may be supplied through the semiconductor memory 62 or 70 to the magnetic tape memory 58 so as to use the semiconductor memory as the buffer memory.

Figure 10:
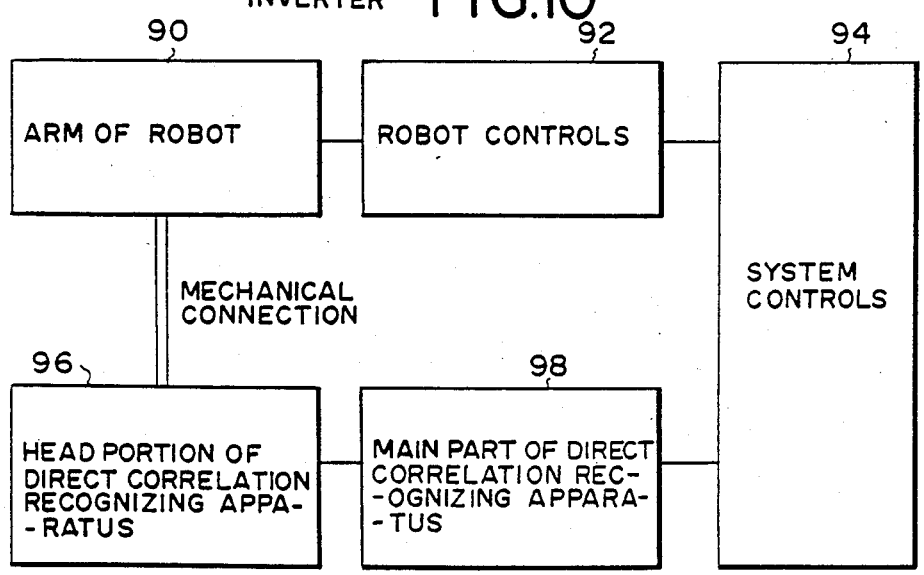
FIG. 10 is a block diagram of a robot system in combination with the system as shown in FIG. 7.

FIG. 10 is a block diagram of an arc welding robot system in combination with the system shown in FIG. 7. A manipulator arm 90 having a welding torch is controlled by a robot controls 92 which receives instructions from a system controls 94. A head portion 96 including the television camera 50 detecting a workpiece is mechanically secured to the manipulator arm 90. The head portion 96 is connected to a main part 98 which includes the remaining parts of the system shown in FIG. 7 excluding the television camera 50. The main part 98 supplies a signal representing the amount and direction of the deviation of the workpiece to the system controls to cause it to correctly move the welding torch tip with respect to the workpiece to be welded. Since all portions of this system other than the correlation detecting system are known, the effect of the combination of the welding robot system with the system shown in FIG. 7 is easily understandable even without further detailed description.

As seen from the above, the direct correlation detection in accordance with this invention makes it possible to automatically detect the deviation of a workpiece in position, in attitude and/or in shape at high speed.

For example, in the case that workpieces of two kinds are continuously conveyed along a conveyor, it is possible to differentiate the workpieces under inspection by kind, by preparing two sets of reference information representing the two kinds of workpieces, respectively, and by comparing the workpiece information with each of the two sets of reference information. Furthermore, in the case that a series of workpieces of the same kind are conveyed in upward attitude or in downward attitude, it is also possible to detect which attitude each workpiece under inspection takes, by preparing two sets of reference information representing the workpieces in the upward and downward attitudes, respectively and comparing the workpiece information with each of the two sets of reference information.

In addition, reference information prepared on the basis of manual calculation may be used instead of the reference information from the image sensor. As the information on objects to be used for obtaining the correlation degree between the objects, there may be used not only the information taken by the "light shear method" but also the binary image information output of the television camera when a workpiece is subjected to blanket illumination. Furthermore, the information may be a Moire fringe pattern, or an acoustic spectrum. Namely, it should be understood that the information is not limited in mode.

Considering now another embodiment of the position deviation detection system of the present invention and referring now to FIGS. 11 through 14, the operation of the position deviation detection system of FIG. 14 will be described for illustrative purposes utilizing an actual image frame for the actual workpiece image of 100×100 picture elements (FIG. 11) and a template reference image (sample) frame of 50×50 picture elements (FIG. 12) for the sample workpiece reference image.

Thus as shown in FIG. 11, the actual image frame as an array of picture elements is defined by 100 columns and 100 rows with each of the picture elements being defined by a corresponding column and row number as depicted. Column and row numbers are referenced about a center reference point with 50 rows above the X axis and 50 rows below the X axis. Correspondingly there are 50 columns to the right of the Y axis and 50 columns to the left of the Y axis. Similarly the template reference image of FIG. 12 is defined as an array of 50 columns and 50 rows with similar reference points.

Figure 13:
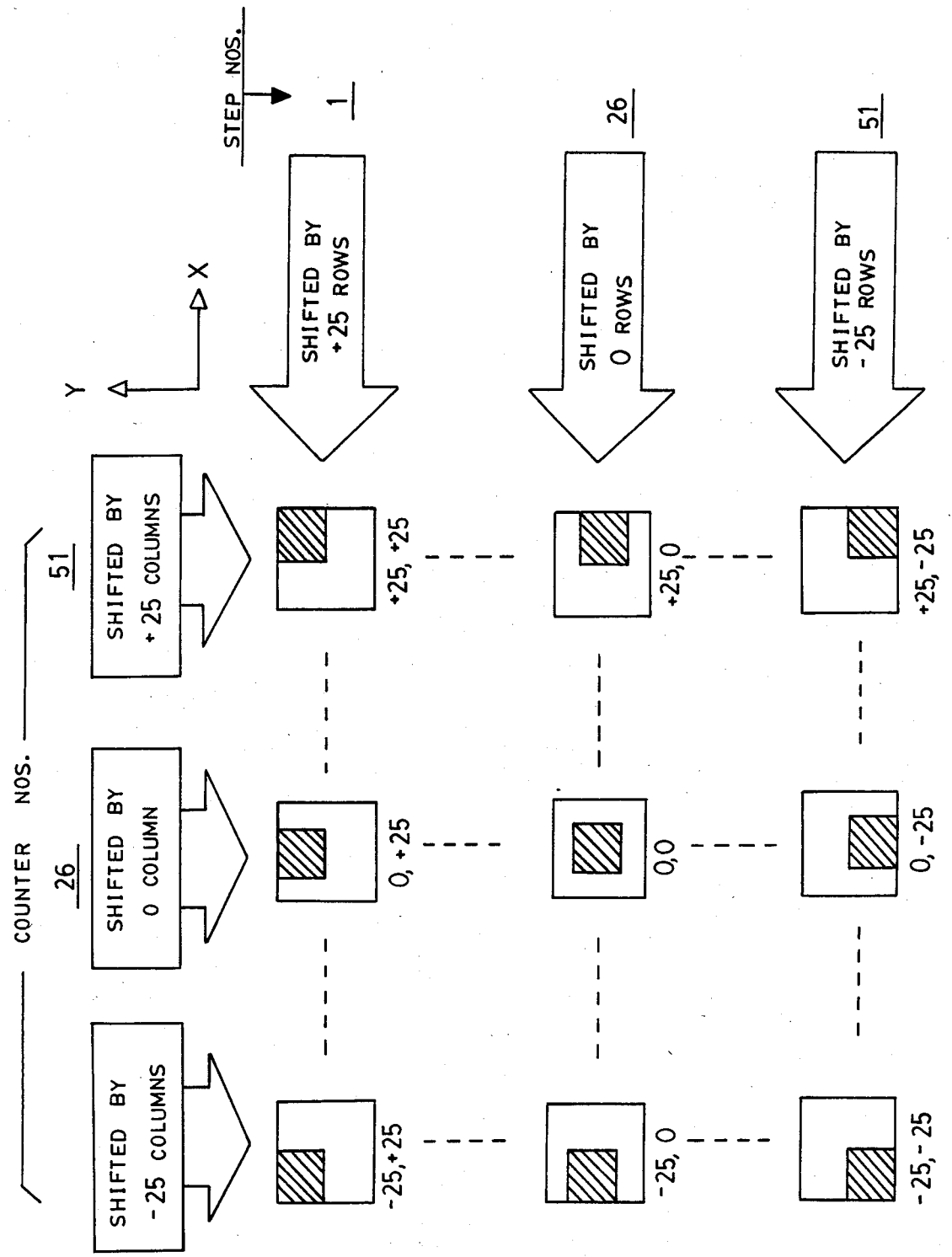
FIG. 13 is a diagrammatic representation conceptually illustrating the operation of a second embodiment of the present invention utilizing the specific actual image frame and template reference image frame of FIGS. 11 and 12.
Figure 14:
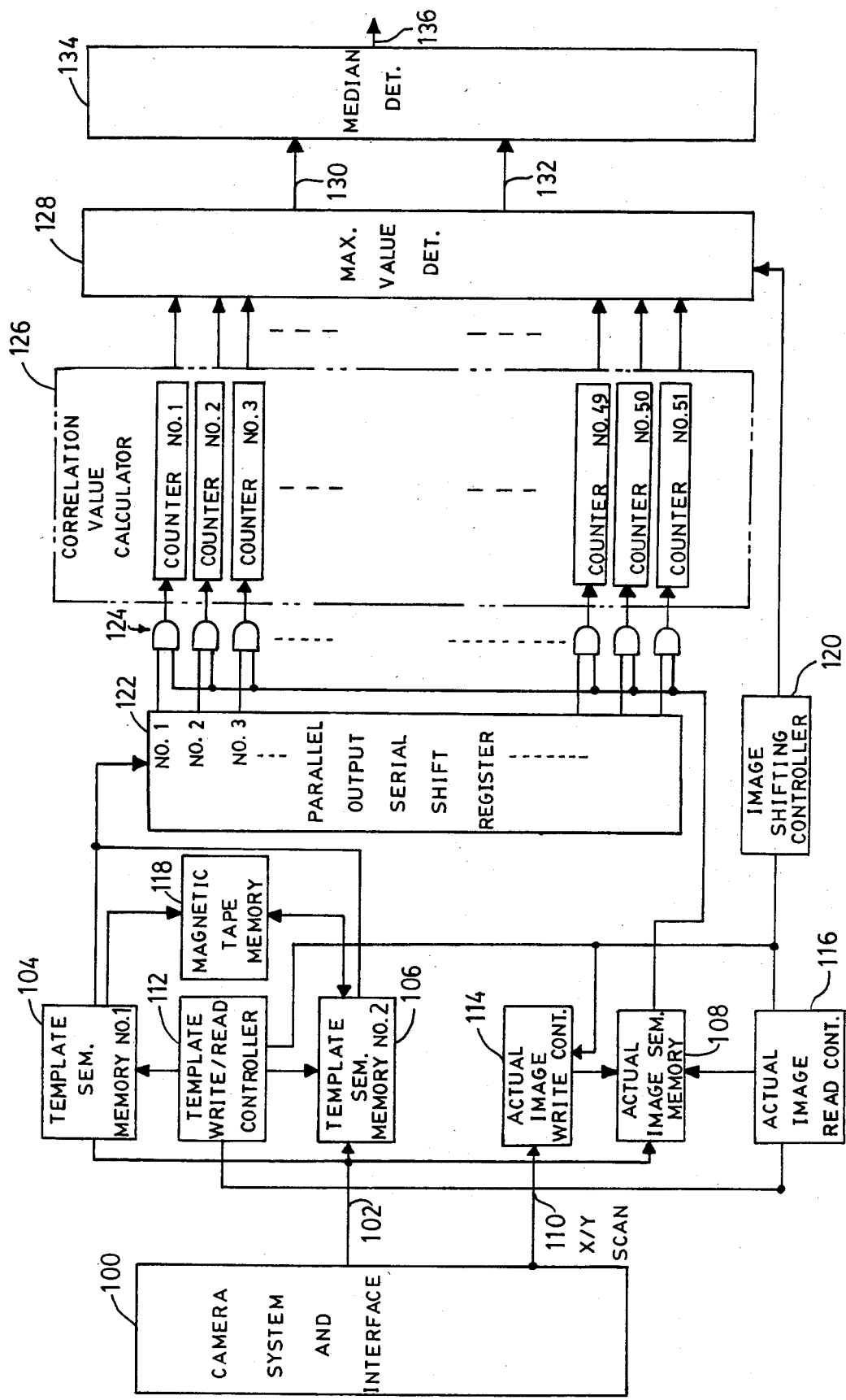
FIG. 14 is a logic and block diagram representation of a second embodiment of the position deviation detecting system of present invention.

In accordance with the principles of the present invention, the position deviation detection system of FIG. 14 in a specific embodiment calculates the degree of correlation between the template reference image and the actual image at 2601 different shifted, aligned positions in accordance with the incremental shifting as illustrated in FIG. 13.

The effective operation of the position deviation detection system of FIG. 14 performs the correlation calculations of the shifted template reference image with each 50×50 array of picture elements of the actual image overlied thereby for the 2601 incrementally shifted combinations as illustrated in FIG. 13. For example, the upper line of FIG. 13 represents the 51 incrementally shifted position of the template reference image from −25 columns to +25 columns for shifting with the reference image shifted upward by +25 rows from the center references. The middle line of FIG. 13 illustrates the incremental shiftings from −25 columns through +25 columns with the reference image in the zero reference position corresponding to an unshifted position. Further the lower line of FIG. 13 illustrates the incremental shiftings from −25 columns through +25 columns of the template reference image on the actual image with the reference image shifted downward by −25 rows. Thus the nine sample shifts of the reference image on the actual image illustrated in FIG. 13 represent the end points of the total of 2601 incrementally shifted positions of the template reference image about the actual image.

The correlation degree for each of the 2601 incrementally shifted positions represents a picture element by picture element correlation between the binary intensity data of each element of the reference image and each element of the actual image overlied by the shifted reference image. In accordance with the direct correlation recognition principles of the present invention, the position deviation detection system of FIG. 14 reads out the complete reference template image data and the appropriate overlied 100 column by 50 row portion of the actual image data once in each of the 51 steps with each of the 51 steps representing the reference image being incrementally shifted by one row with respect to the actual image frame.

Referring now to FIG. 14, the position deviation detection system includes a camera system and interface stage referred to generally at 100 that selectively provides a bright/dark binary intensity signal at 102 to a first template semiconductor memory 104, a second template semiconductor memory 106 or an actual image semiconductor memory 108. Further the camera system and interface stage 100 provides an X/Y scan signal at 110 to a template write/read controller 112, an actual image write controller 114, and an actual image read controller 116. The template image data is also capable of being transferred between the first and second template semiconductor memories 104 and 106 and a magnetic tape memory 118. An image shifting controller 120 is connected to control the operation of the actual image read controller 116 and the template write/read controller 112. The operation of these elements is substantially as described hereinbefore in connection with the embodiment of FIG. 7 with template reference image data being transferred either directly or indirectly into the magnetic tape memory 118 and the actual image data for successive workpieces being stored in the actual image memory 108.

The data outputs of the first and second template semiconductor memories 104 and 106 are connected to the data input of a parallel output serial shift register 122 having 51 stages and 51 corresponding outputs. Thus the picture element intensity data in binary form is read out from either of the template memories 104, 106 in serial fashion, and is shifted through the stages of the shift register 122, and output in parallel form at the respective parallel shift register outputs of the 51 stages. The data output of the actual image semiconductor memory 108 is connected to a first input of each of 51 AND gates referred to generally as an array at 124. The second input of each of the AND gates in the array 124 is each respectively connected one of the 51 parallel outputs of the parallel output serial shift register 122.

The output of each of the AND gates in the array 124 is respectively connected to the count input of a respective one of 51 counters referred to generally in the correlation value calculator arrangement 126. The counters in the correlation value calculator arrangement 126 are numbered 1 through 51 corresponding to the 51 outputs of the shift register stage 122. The outputs of the 51 counters in the correlation value calculator arrangement 126 are connected to a maximum value detector stage 128. The maximum value detector stage 128 provides a horizontal shift output at 130 and a vertical shift output at 132.

The maximum value detector stage 128 provides the binary representation of the horizontal shifting value at 130 and the vertical shifting value at 132 obtained throughout the incremental shifting of the 2601 shifted reference images about the actual image that results in the maximum correlation degree. The horizontal shifting value at 130 represents the number of columns by which the template reference image is shifted when the maximum correlation value is obtained over the 2601 shifted position in the correlation value calculator 126 from the 51 counters and over the 51 steps. The vertical shift value at 132 corresponds to the number of rows shifted when the maximum correlation value is obtained by the counters in the correlation value calculator 126.

As will be explained in more detail hereinafter, the best horizontal shifting value corresponds to the counter number during the particular step that results in the maximum correlation degree and the vertical shift value corresponds to the step number of the 51 steps during which one of the 51 counters provides the maximum correlation degree.

In one embodiment of the position deviation detection system of FIG. 14, the horizontal shaft data at 130 and the vertical shift data at 132 are provided directly to the system controller 94 of FIG. 10 as the quantities Sx and Sy corresponding to the horizontal shift in columns and the vertical shift in rows respectively through which the template reference image is shifted to obtain the best correlation degree with the actual image. Thus as discussed hereinbefore, the system controls 94 utilizes the quantities −Sx and −Sy to correctly calculate the desired position of the robot arm 90 to accurately move the welding torch tip with respect to the workpiece to be welded.

In applications of the position deviation detection system of FIG. 14 wherein the work environment includes a high degree of optical and/or electrical noise conditions such as to disturb image data or reliable logic operations of the system, or due to the optical characteristics of the workpiece surface, a median detector arrangement 134 is provided in the position deviation detection system of FIG. 14.

The position deviation detection system successively acquires a predetermined number of actual images of the workpiece and the maximum value detector 128 is operated to obtain horizontal and vertical shift values at 130, 132 respectively for each of the actual images. The median detector 134 calculates the median value of each of the horizontal and vertical shift data for the predetermined number of successive images and provides an output at 136 to the system controls 94 representing the median value of the horizontal shift and the median value of the vertical shift for the predetermined number of images and respective correlation recognizing operations.

To illustrate the operation of the position deviation detection system of FIG. 14, the following Tables A, B and C are useful to explain how the correlation data is presented as a function of time to the correlation value calculator arrangement 126 and the 51 counters included therein. Reference may also be made to FIGS.

11 through 13 to aid in the understanding of the operation depicted in the Tables A, B and C.

TABLE A

PART 1 (STEP NO. 1)

TIME →

| INPUT FROM | | 1st Status | 2nd Status | 3rd Status | ------ | 99th Status | 100th Status |
|---|---|---|---|---|---|---|---|
| Actual Memory | | P(−50, +50) | P(−49, +50) | P(−48, +50) | ------ | P(+49, +50) | P(+50, +50) |
| Parallel | No. 1 | P(−25, +25) | P(−24, +25) | P(−23, +25) | ------ | X | X |
| Output | No. 2 | X | P(−25, +25) | P(−24, +25) | ------ | X | X |
| Serial Shift | No. 3 | X | X | P(−25, +25) | ------ | X | X |
| Registers | No. 4 | X | X | X | ------ | X | X |
| | ⋮ | ⋮ | ⋮ | ⋮ | ⋮ | ⋮ | ⋮ |
| | No. 50 | X | X | X | ------ | P(+25, +25) | X |
| | No. 51 | X | X | X | ------ | P(+24, +25) | P(+25, +25) |

PART 2 (STEP NO. 1)

TIME →

| INPUT FROM | | 101th Status | 102th Status | 103th Status | ------ | 199th Status | 200th Status |
|---|---|---|---|---|---|---|---|
| Actual Memory | | P(−50, +49) | P(−49, +49) | P(−48, +49) | ------ | P(+49, +49) | P(+50, +49) |
| Parallel | No. 1 | P(−25, +24) | P(−24, +24) | P(−23, +24) | ------ | X | X |
| Output | No. 2 | X | P(−25, +24) | P(−24, +24) | ------ | X | X |
| Serial Shift | No. 3 | X | X | P(−25, +24) | ------ | X | X |
| Registers | No. 4 | X | X | X | ------ | X | X |
| | ⋮ | ⋮ | ⋮ | ⋮ | ⋮ | ⋮ | ⋮ |
| | No. 50 | X | X | X | ------ | P(+25, +24) | X |
| | No. 51 | X | X | X | ------ | P(+24, +24) | P(+25, +24) |

PART 3 (STEP NO. 1)

TIME →

| INPUT FROM | | 4901th Status | 4902th Status | 4903th Status | ------ | 4999th Status | 5000th Status |
|---|---|---|---|---|---|---|---|
| Actual Memory | | P(−50, +1 ) | P(−49, +1 ) | P(−48, +1 ) | ------ | P(+49, +1 ) | P(+50, +1 ) |
| Parallel | No. 1 | P(−25, −25) | P(−24, −25) | P(−23, −25) | ------ | X | X |
| Output | No. 2 | X | P(−25, −25) | P(−24, −25) | ------ | X | X |
| Serial Shift | No. 3 | X | X | P(−25, −25) | ------ | X | X |
| Registers | No. 4 | X | X | X | ------ | X | X |
| | ⋮ | ⋮ | ⋮ | ⋮ | ⋮ | ⋮ | ⋮ |
| | No. 50 | X | X | X | ------ | P(+25, −25) | X |
| | No. 51 | X | X | X | ------ | P(+24, −25) | P(+25, −25) |

TABLE B

PART 1 (STEP NO. 2)

TIME →

| INPUT FROM | | 1st Status | 2nd Status | 3rd Status | ------ | 99th Status | 100th Status |
|---|---|---|---|---|---|---|---|
| Actual Memory | | P(−50, +49) | P(−49, +49) | P(−48, +49) | ------ | P(+49, +49) | P(+50, +49) |
| Parallel | No. 1 | P(−25, +25) | P(−24, +25) | P(−23, +25) | ------ | X | X |
| Output | No. 2 | X | P(−25, +25) | P(−24, +25) | ------ | X | X |
| Serial Shift | No. 3 | X | X | P(−25, +25) | ------ | X | X |
| Registers | No. 4 | X | X | X | ------ | X | X |
| | ⋮ | ⋮ | ⋮ | ⋮ | ⋮ | ⋮ | ⋮ |
| | No. 50 | X | X | X | ------ | P(+25, +25) | X |
| | No. 51 | X | X | X | ------ | P(+24, +25) | P(+25, +25) |

PART 2 (STEP NO. 2)

TABLE B-continued

PART 3 (STEP NO. 2)

| INPUT FROM | | 101th Status | 102th Status | 103th Status | ------ 199th Status | 200th Status |
|---|---|---|---|---|---|---|
| Actual Memory | | P(−50, +48) | P(−49, +48) | P(−48, +48) | ------ P(+49, +48) | P(+50, +48) |
| Parallel | No. 1 | P(−25, +24) | P(−24, +24) | P(−23, +24) ------ | X | X |
| Output | No. 2 | X | P(−25, +24) | P(−24, +24) ------ | X | X |
| Serial Shift | No. 3 | X | X | P(−25, +24) ------ | X | X |
| Registers | No. 4 | X | X | X | ------ | X | X |
| | ⋮ | ⋮ | ⋮ | ⋮ | ⋮ | ⋮ |
| | No. 50 | X | X | X | ------ P(+25, +24) | X |
| | No. 51 | X | X | X | ------ P(+24, +24) | P(+25, +24) |

| INPUT FROM | | 4901th Status | 4902nd Status | 4903rd Status | ------ 4999th Status | 5000th Status |
|---|---|---|---|---|---|---|
| Actual Memory | | P(−50, −1) | P(−49, −1) | P(−48, −1) ------ | P(+49, −1) | P(+50, −1) |
| Parallel | No. 1 | P(−25, −25) | P(−24, −25) | P(−23, −25) ------ | X | X |
| Output | No. 2 | X | P(−25, −25) | P(−24, −25) ------ | X | X |
| Serial Shift | No. 3 | X | X | P(−25, −25) ------ | X | X |
| Registers | No. 4 | X | X | X | ------ | X | X |
| | ⋮ | ⋮ | ⋮ | ⋮ | ⋮ | ⋮ |
| | No. 50 | X | X | X | ------ P(+25, −25) | X |
| | No. 51 | X | X | X | ------ P(+24, −25) | P(+25, −25) |

PART 1 (STEP NO. 51)

| INPUT FROM | | 1st Status | 2nd Status | 3rd Status | ------ 99th Status | 100th Status |
|---|---|---|---|---|---|---|
| Actual Memory | | P(−50, −1) | P(−49, −1) | P(−48, −1) ------ | P(+49, −1) | P(+50, −1) |
| Parallel | No. 1 | P(−25, +25) | P(−24, +25) | P(−23, +25) ------ | X | X |
| Output | No. 2 | X | P(−25, +25) | P(−24, +25) ------ | X | X |
| Serial Shift | No. 3 | X | X | P(−25, +25) ------ | X | X |
| Registers | No. 4 | X | X | X | ------ | X | X |
| | ⋮ | ⋮ | ⋮ | ⋮ | ⋮ | ⋮ |
| | No. 50 | X | X | X | ------ P(+25, +25) | X |
| | No. 51 | X | X | X | ------ P(+24, +25) | P(+25, +25) |

PART 2 (STEP NO. 51)

| INPUT FROM | | 101th Status | 102nd Status | 103rd Status | ------ 199th Status | 200th Status |
|---|---|---|---|---|---|---|
| Actual Memory | | P(−50, −2) | P(−49, −2) | P(−48, −2) ------ | P(+49, −2) | P(+50, −2) |
| Parallel | No. 1 | P(−25, +24) | P(−24, +24) | P(−23, +24) ------ | X | X |
| Output | No. 2 | X | P(−25, +24) | P(−24, +24) ------ | X | X |
| Serial Shift | No. 3 | X | X | P(−25, +24) ------ | X | X |
| Registers | No. 4 | X | X | X | ------ | X | X |
| | ⋮ | ⋮ | ⋮ | ⋮ | ⋮ | ⋮ |
| | No. 50 | X | X | X· | ------ P(+25, +24) | X |
| | No. 51 | X | X | X | ------ P(+24, +24) | P(+25, +24) |

PART 3 (STEP NO. 51)

| INPUT FROM | 4901th Status | 4902nd Status | 4903rd Status ------ | 4999th Status | 5000th Status |
|---|---|---|---|---|---|

-continued

| | | | | | | |
|---|---|---|---|---|---|---|
| Actual Memory | | P(−50, −50) | P(−49, −50) | P(−48, −50) ------ | P(+49, −50) | P(+50, −50) |
| Parallel | No. 1 | P(−25, −25) | P(−24, −25) | P(−23, −25) ------ | X | X |
| Output | No. 2 | X | P(−25, −25) | P(−24, −25) ------ | X | X |
| Serial Shift | No. 3 | X | X | P(−25, −25) ------ | X | X |
| Registers | No. 4 | X | X | X ------ | X | X |
| | ⋮ | ⋮ | ⋮ | ⋮ | ⋮ | ⋮ |
| | No. 50 | X | X | X ------ | P(+25, −25) | X |
| | No. 51 | X | X | X ------ | P(+24, −25) | P(+25, −25) |

Table A represents the operation of the position deviation detection system of FIG. 14 during what is defined as step 1 of operation corresponding to the first row of FIG. 13 during which the binary intensity image data of the reference image is shifted from −25 columns through +25 columns in the X direction with the reference image shifted upward by +25 rows and the reference image data being compared with the corresponding overlied portion of the actual image. While the portions of Table A are arranged in status portions 1 through 100, 101 to 200 and 4,901 to 5,000, it should be understood that Table A may be conveniently rearranged for clarity by aligning the Table portions in horizontal fashion edge to edge such that the top row of status numbers of the Table portions are aligned.

The first step of operation includes 5000 statuses and respective shifts in time of the parallel output serial shift register 122 during which the entire reference image is serially read out picture element by picture element while the upper portion of the actual image is read out defined between the points P(−50, +50), P(+50, +50), P(−50, +1), and P(+50, +1). Each column of Table A thus corresponds to the comparison correlations being performed by the And gate array 124 between the depicted inputs from the actual memory and the corresponding outputs of the 51 stages of the parallel output serial shift register 122. The results of these correlation comparisons will present the outputs of the And gate array 124 to the respective 51 correlation counters in the correlation value calculator 126.

The top row of each Table A portion immediately below the status number represents the data read out during each status from the actual image memory 108. The remaining lower rows of Table A represent the outputs of the 51 corresponding shift register stages during the first step represented in Table A; the data of the 5,000 picture elements in the upper half of the actual image being serially read out from the actual memory 108 element by element in each of the 5,000 statuses and in a row by row progression. The first row immediately below the actual memory data of Table A corresponds to the output of the first shift register stage of 122 and thus corresponds to the reference image data read out from the template memory 104 into the first shift register stage of 122. The remaining rows correspond respectively to the data output from the shift register stages 2 through 51 in accordance with the shifting accomplished at each status of the 5,000 statuses. Accordingly, the first and second rows of each portion of Table A represents the correlation performed by the first And gate in the array 124 and the results provided to the counter number one stage of the correlation value calculator 126.

Specifically, in the first status, points P(−50, +50) of the actual image and the point P(−25, +25) of the template reference image are compared in the first And gate during the first status. Thus, the 5,000 statuses of step number one depicted in Table A represent the summation of correlations of picture elements performed and accummulated in counter number one of the correlation value calculator 126 corresponding to the overall correlation between corresponding picture elements between the template reference image and the actual image portion overlied and defined by the end points P(−50, +50), P(−1, +50), P(−50, +1) and P(−1, +1). This corresponds to the correlation depicted in FIG. 13 in the upper left hand corner designated by the column "counter number one" and the row "step number one".

It can be seen from Table A that during the operation of the position deviation detection system of FIG. 14, no reference image data is inputted to the parallel output serial shift register 122 between any status numbers ending in 51 or 00; for example, between statuses 51 and 100, 151 and 200, ... and 4,951 and 5,000. This corresponds to the status times when a complete row of the template reference image has been read out and the picture element data for a complete row of actual image frame elements in columns plus one to plus fifty are being read out. However, it should be understood from the entries in Table A that although no new data is read in from the reference template image, correlations are still being performed and presented to the correlation counters in 126 due to the contents and shifting of the remaining shift register stages.

Referring now to Table B, the operation of the position deviation detecting system of FIG. 14 during step 2 is illustrated. The 5,000 statuses represent the correlation between the data in the first two rows below the status number heading, picture element by picture element, between the actual image portion bounded by the end points P(−50, +49), P(−1, +49), P(−50, −1) and P(−1, −1) with the template reference image as performed in counter number one. Thus, step two represents the correlation between the actual image and the reference image shifted upward by plus 24 rows of a one row decrement from the first step. The portion of the actual image read out to the And gate array 124 in step 2 for comparison correlation purposes is defined by the endpoints P(−50, +49), P(+50, +49), P(−50, −1), and P(+50, −1).

Accordingly, each of the remaining steps 3 through 51 of the correlation operation involves a shifting of the template reference image by one row between each step and a corresponding one row decrement of the starting point of the actual image that is read out which defines the appropriate overlied portion of the actual image as depicted in FIG. 13. Accordingly, the 51st step of operation as depicted in Table C comprises the correlation factor calculations illustrated in the bottom row of FIG. 13 with the reference image shifted by −25 rows with respect to the actual image center reference.

Figure 15:
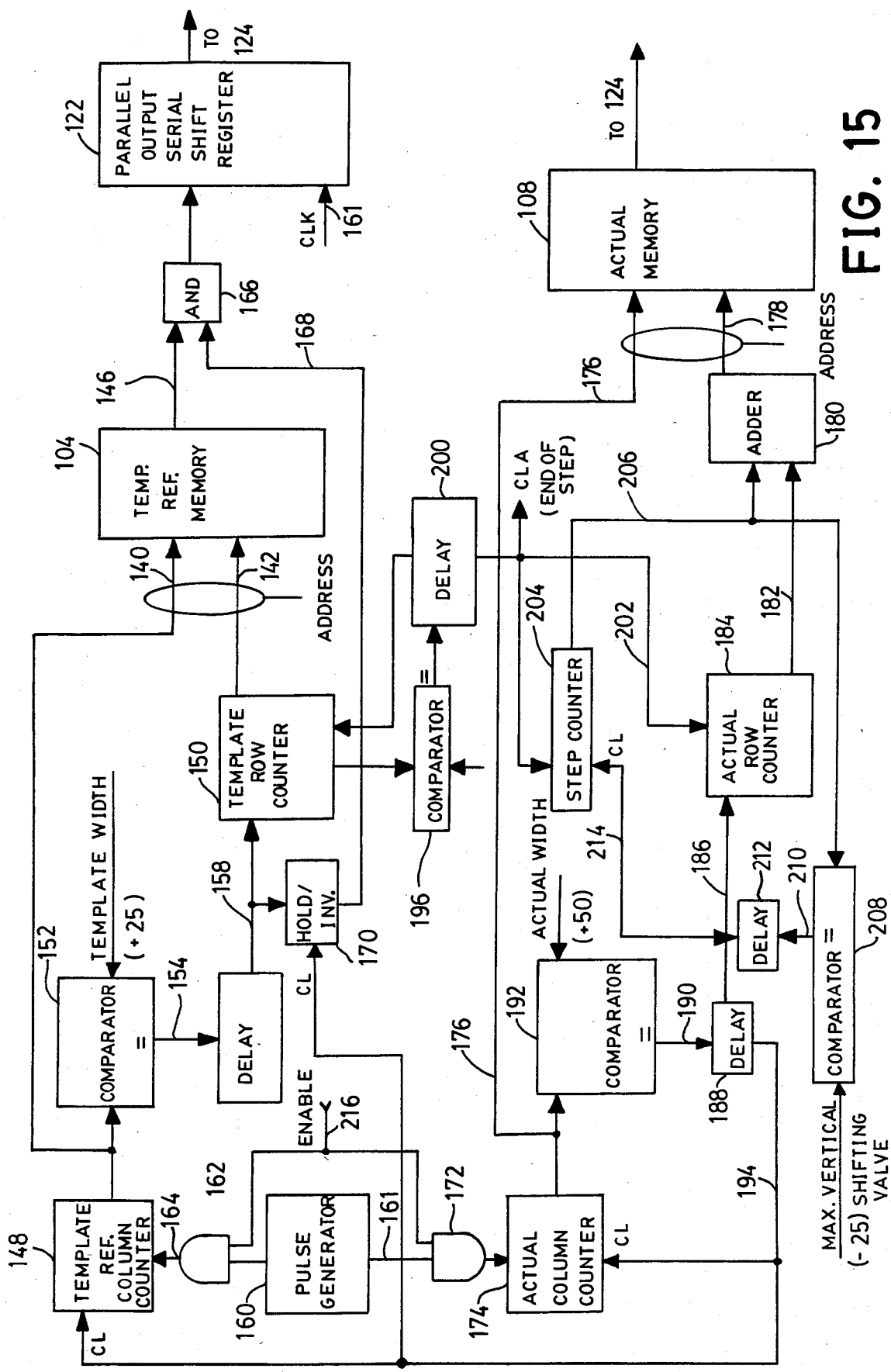
FIG. 15 is a logic and block diagram representation of portions of the position deviation detecting system of FIG. 14.

Referring now to FIG. 15 and considering the detailed structure and operation of the position deviation detecting system of FIG. 14 to provide the template reference image data and the actual image data in appropriate correspondence to the And gate array 124 in Tables A, B and C, the template reference image memory 104 is addressed by a column address data input 140 and a row address data input 142 to output the picture element binary intensity data in serial form at a data output 146.

The template address data input 140 is provided at the output of a template reference column counter 148 that includes a range of output −25 to +75. The row address data input 142 is provided by a template reference row counter 150 with an output in the range +25 to −75. The column address data signal 140 is also connected to one input of a comparator 152. The second input to the comparator 152 is connected to a template width reference signal set to +25. The comparator 152 provides an output at 154 whenever the column address signal 140 is equal to +25. The output 154 of the comparator 154 is connected through a delay stage 156 to provide a delayed output 158 connected to the count input of the template row counter 150.

Upon each occurrence of the count signal at 158, the template row counter 150 is decremented by one row such that successive inputs at 158 decrement the counter from +25 to −25 at the row address data signal 142. In this manner the template reference memory 104 is scanned row by row over the entire reference image. Further the template reference memory 104 provides no output at 146 during times that the column address signal 140 is in the range +26 to +75 corresponding to the zero reference image outputs as required and illustrated in Tables A through C.

A pulse generator 160 provides a clock output 161 through an And gate 162 to a count signal input 164 to the template column counter 148 such that successive pulses at 164 advance the counter output at 140 through the range −25 to +75. Thus, the output pulses of the pulse generator 160 correspond to the various status times 1 through 5,000 of each operation step.

The picture element data at 146 from the template reference memory 104 is connected to one input of an And data gate 166. The output of the And gate 166 is connected to the data input of the parallel output serial shift register stage 122. The second input 168 to the And gate 166 is provided at the output of a hold/inverter stage 170. The input to the hold/inverter stage 170 is the output 158 of the delay stage 156. The input 168 of the And gate 166 ensures a zero output to the shift register 122 for the appropriate statuses ending in 51 through 00 and corresponding to the time during which the remaining portions of the rows of the actual image are being read out after the completion of the read out of a row of the template reference image. Thus the output 168 inhibits operation of the And gate 166 through the delay stage 156 after the comparator 152 provides an output corresponding to the template reference column counter 148 outputting a value equal to or greater than +25.

The clock output 161 of the pulse generator 160 is also connected to the clock input of the shift register 122 for shifting operation. In a specific embodiment, the clock pulse signal at 161 is arranged to cause shifting of the shift register 122 on a positive going rising edge of a clock pulse and the template reference column 148 is incremented in count on the falling edge of each clock pulse.

The pulse generator 160 also provides the clock pulse output 161 through an And gate 172 to an actual image column counter 174. The actual column counter 174 provides an output at 176 in the range of −50 to +50 as a column address data input to the actual memory 108. The actual memory 108 also includes a row address data input at 178 provided at the output of an adder stage 180. A first input 182 to the adder stage 180 is provided by an actual row counter 184 with a data signal in the range of −25 to +25. The clock or count input 186 of the row counter 184 is provided through a delay stage 188. The delay stage 188 is driven by the output 190 of a comparator 192. Comparator 192 includes a first input from the column address signal 176 and a second input connected to an actual width reference signal set to +50.

The comparator 192 provides an output at 190 whenever the column address signal 176 is equal to or greater than the reference signal +50. Thus, as the actual column counter 174 at column address signal 176 is incemented from −50 to +50 by the pulse generator 160 corresponding to a complete row of actual image information, the actual row counter 184 is decremented by one count equivalent to one row. Thus, after a complete row of actual image data is read out, the actual row counter is decremented to read out the next row of the actual image data. The delay stage 188 also provides a clear signal output 194 after each complete row of actual image data is read out. The clear signal 194 is connected to the actual column counter 174, the template reference column counter 148 and the hold/invert stage 170 to thus clear these devices after a complete row of actual image data has been read out. Thus, there is no output from the And gate 166 after the time that the template reference counter reaches +25 until after the time that the clear signal 194 is generated.

The range in the actual row counter 184 is +25 to −25 since only 50 rows of the actual image are overlied by the reference image and thus correlation information can only be obtained over 50 rows of the actual image for each step of operation. Thus, the template column counter 148 and the template row counter 150 are used to scan and read out the template reference image data and are cleared at the beginning of each step. The actual column counter 174 and the actual row counter 184 scan or control the read out of actual image data and are also cleared at the beginning of every step.

The count data (row address) output 142 of the template row counter 150 is also connected to one input of a comparator 196. The second input to the comparator 196 is connected to a template height reference signal set to −25. The output 198 of the comparator changes state whenever the output of the template row counter is equal to −25. The output 198 of the comparator 196 is connected through a delay stage 200 to provide an "end of step" signal at 202 that is connected to the clock or count input of a step counter 204. The end of step signal 202 is also provided as a clear signal to clear or reset the actual row counter 184 and the template row counter 150.

The step counter 204 provides a count data output at 206 in the range +25 to −25 which corresponds to template reference image shifting of +25 to −25 rows as shown in FIG. 13 and corresponding respectively to steps one through 51 of operation. A count output 206 of the step counter 204 is connected as a second input to the adder 180 and is also connected to one input of a comparator stage 208. A second input to the comparator stage 208 is connected to a maximum vertical shifting value reference input set to −25.

The output 210 of the comparator changes stage whenever the step counter output 206 is equal to −25 corresponding to the 51st step; the completion of the correlation calculation for each of the shifted reference images over the actual image. The output 210 of the comparator is connected through a delay stage 212 to provide a clear signal at 214 connected to clear the step counter 204. Thus, after the 51 steps of operation have been completed, the step counter 204 is cleared to restart at +25 for the next correlation operation between the actual image and the reference image.

The adder stage 180 at the beginning of the first step of operation thus provides a +50 signal at the row address input 178 by combining the +25 output at 182 in the actual row counter and the +25 output from the step counter 204. Thus throughout step one, the step counter output at 206 remains at +25 and the actual row counter is decremented from +25 to −25 resulting in a row address output at 178 throughout step one in the range of +50 to +1. During the second step of operation the step counter output at 206 is equal to +24 and correspondingly the row address output at 178 is in the range +49 to −1.

Correspondingly as the step counter 204 is decremented throughout the 51 steps, during the 51st step the step counter output 206 is −25 and the row address signal at 178 is in the range of −1 to −50.

For conceptual explanation purposes to understand the relationship between the row and column numbers of the template and actual images and the relative shifting as shown in FIG. 13 throughout the various operations, the various devices of FIG. 15 have been discussed with ranges such as +25 to −25. Accordingly, for implementation of the devices it might be desireable to provide a range of operation from +50 to 0 corresponding to +25 to −25. Thus it should be realized that the reference and template images are defined as ± row and column numbers without a zero row or column; i.e. a transition from −1 to +1 about the reference point. Thus, for example, the step counter 204 might operate in the range of +50 to 0 for the first through 51st steps and the actual row counter will operate in the range +50 to 0. Further, it sould be understood that when ±25 ranges are discussed, the addess signal at 178 for exmple to the memory 108 does not correspond to the actual row numbers of the actual image. Correspondingly, the memories 104 and 108 may be addressed by consecutive binary address numbers representing a combination of the row and column address inputs and may be offset for convenience of memory implementation by various binary numbers. For example, the image points in a row +50 throughout columns −50 to +50 of the actual image may be defined as 10,050 through 10,150 and the data in row 49 may be addressed as 9,949 through 10,049.

Correspondingly, the actual image may be defined for ease of logic implementation as columns 1 through 100 and rows 1 through 100 and the reference image as columns 1 through 50 and rows 1 through 50. Thus, during the first step, the step counter 204 would output a value of 50 and the actual row counter 184 would operate in the range from 50 down to 1 with the resultant row address at 178 being in the range 100 to 51 (the top 50 rows of the actual image). Further, during step 2, the step counter 204 is decremented to 49 at 206 and the row address at 178 is in the range 99 to 50. During the 51st step the step counter 204 is set to 0 at output 206 and thus the row address signal at 178 is in the range 50 to 1 corresponding to the lower 50 rows of the actual image.

The second input to each of the And gates 162 and 172 is connected to an enable signal 216 obtained from the maximum value detector 128 and will be explained in more detail hereinafter in connection with FIG. 16. Basically, the enable signal 216 is provided to allow operation of the devices in FIG. 15 to accomplish the reading out of data to the parallel output shift register 122 and the And gate array 124 during each step. At the end of each step, the maximum value detector 128 determines which counter of the 51 counters in the correlation value calculator 126 provides the highest count which corresponds to the column shift of maximum correlation. Thus, during the calculation time of the maximum value detector 128 at the end of each step, the reading out of data and shifting of the parallel shift register 122 is disenabled by means of the signal 216 until the completion of operation of the maximum value detector 128. Subsequently, the maximum value detector 128 determines the counter number in the step of the 51 steps resulting in the maximum correlation degree which determnies the horizontal and vertical shift values corresponding to the maximum correlation as explained hereinbefore.

Figure 16:
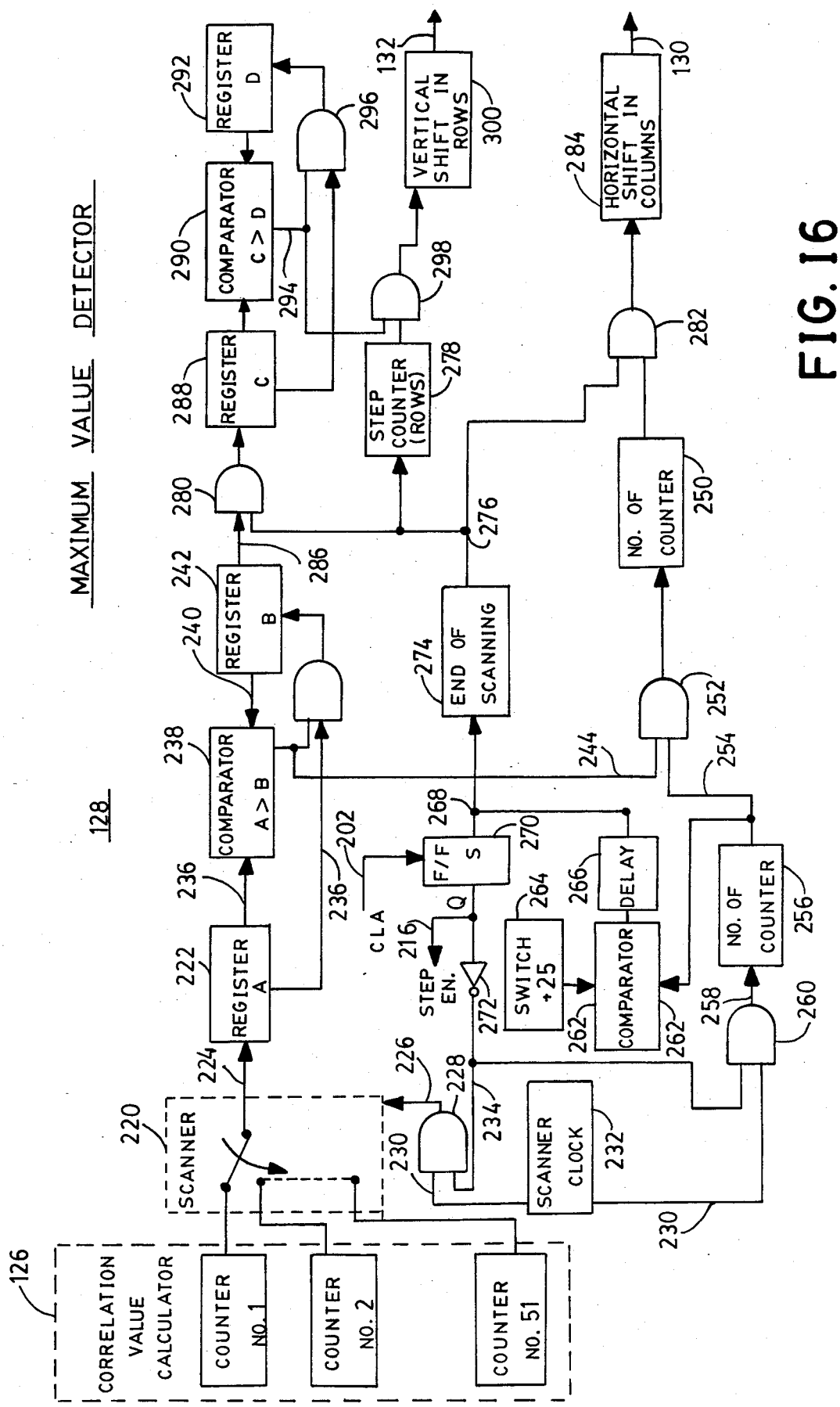
FIG. 16 is a logic and block diagram representation of portions of the position deviation detecting system of FIG. 14 illustrating the details of the maximum value detector.

Referring now to FIG. 16 and considering now a more detailed discussion of the maximum value detector stage 128, a scanner stage 220 is provided to sequentially connect the outputs from the 51 counters in the correlation calculator 126 to a data register 222 over a scanner output 224. Thus, the scanner 220 may be represented as a scanning switch which sequentially scans the counter outputs and connects each of the outputs to provide the data to the data register 222. Of course, it should be understood that in a specific embodiment logic circuitry is utilized to implement the scanner 220. The scanning operation of stage 220 is controlled at a clock input 226. The scanner clock input 226 is provided at the output of a two input And gate 228 having one input connected to the output 230 of a scanner clock stage 232. The second input 234 of the And gate 228 is connected to a scan enable signal that will be explained hereinafter.

The output 236 of the data register 222 designated Register A is provided to an A input of a comparator 238. A second B input of the comparator 238 at 240 is provided by the data output of a second register 242 designated Register B. The output 244 of the comparator 238 changes state whenever the A input is greater than the B input. The output 244 is connected as an enable signal to the enable input of a data gate 246 that includes as data inputs the data output 236 of the register A 222. It should be understood that throughout the foregoing and succeeding explanation while various data lines are shown as represented by a single line, the data lines are representive of a number of binary or BCD output lines to represent a binary data signal.

When the enable signal 244 is a high level, corresponding to the A input being greater than the B input of the comparator 238, the data gate 246 is enabled to transfer the contents of register A at 236 into register B 242 over the data line 248.

Accordingly, as the scanner clock 232 causes the scanner 220 to scan the 51 counter outputs, the contents of register A are transferred to register B whenever the data in register A is greater than register B. Thus, at the end of a scanning interval after the scanner 220 scans the 51 counters during each step of operation, the register B will be loaded with the maximum correlation degree as a binary number that is the maximum of the 51 counters. The number of the counter corresponding to the maximum value stored in the register 242 is stored in a data latch 250.

The number of the counter in the stage 250 is provided at the output of a data gate 252. A first enable input of the data gate 252 is connected to the output 244 of the comparator 238. A second data input 254 to the gate 252 is connected to the data output of a counter 256 that holds the number of the current counter of the 51 counters that is being scanned and the respective correlation data being transferred to register A 222. A clock input 258 of the counter 256 is provided at the output of a 2 input And gate 260. One input to the And gate 260 is connected to the scanner clock output 230. The second input of the And gate 260 is connected to the enable scan line 234. Thus, when the scanning interval is enabled to scan the 51 counters, the counter 256 is incremented one count each time the scanner 220 is pulsed to scan a different counter. The counter 256 operates in the range from $-25$ to $+25$ corresponding to counters 1 through 51 such that the counter output at 254 corresponds to the horizontal shift in columns.

The output 254 of the counter 256 is also connected to one input of a comparator stage 262. The second input to the comparator stage 262 is connected to a reference input device 264 set to a $+25$ value. When the counter output 254 is equal to $+25$, the comparator 262 outputs through a delay stage 266 a change of state signal at 268 to the set input of a flip-flop 270. The Q data output of the flip-flop 270 provides a step enable signal 216 to the pulse generator control gates 162 and 172 of FIG. 15. The step enable signal 216 is connected through an inverter gate 272 to provide the scan enable signal 234. Thus, when the counter 256 reaches a $+25$ value, the flip-flop 270 is set to desenable the scanning since all 51 counters have been scanned and their contents read and compared at the completion of operation of one step of the position detection system.

Thus, at the end of each step of operation, to accumulate the correlation values in the counters of arrangement 126, the 51 counters are scanned and the maximum correlation value is transferred to the register B 242. At the end of each step of operation, the clear signal 202 of FIG. 15 is provided to the flip-flop stage 270 to clear the flip-flop and thus enable scanning operation. After this is accomplished, the next step of operation is started. This process continues until all 51 steps of operation are completed with interim scanning intervals and storage of the maximum correlation counter data in the register B 242.

The output 268 obtained at the end of each scanning interval is also connected to and end of scan latch 274. The end of scan latch 274 provides an end of scan signal at 276 that is connected to the count input of a step counter 278. The step counter 278 operates in the range $-25$ to $+25$ and corresponds to the vertical shift in rows of each step for each step number of operation. The end of scan signal 276 is also connected to the enable input of each of two data gates 280 and 282. The data gate 282 includes a data input connected to the count output of the counter 250 containing the number of the counter having the maximum value for each step.

The output of the data gate 282 is connected to a data register output stage 284 to provide the output 130 representing the horizontal shift in columns that results in the maximum correlation degree for all steps of operation. The data input of the data gate 280 is connected to the data output 286 of the register B 242. The data output of the data gate 280 is connected to the data input of a register C 288.

Thus, the data transferred into the register C 288 at the end of each scanning step represents the maximum correlation value obtained in all the previous steps and at the end of 51 steps represents the maximum correlation value obtained by any of the 51 counters during all 51 steps. The data output of the register C 288 is connected to a C input of a comparator stage 290. The second B input to the comparator 290 is connected from the data output of a register D stage 292. The output 294 of the comparator 290 is connected to the enable input of a data gate 296. The data output of the register C 288 is connected to the data input of the data gate 296. The data output of the data gate 296 is connected to the data input of the register D 292. The output 294 of the comparator 290 enables the data gate 296 to transfer the contents from register C to register D whenever the contents of register C is greater than the contents of register D.

Thus, during the operation of the maximum value detector 128, the contents of register C represent the current maximum correlation degree data that was obtained by any of the 51 counters during the previous steps. Thus, the contents of register D 292 at the end of 51 steps is the maximum correlation value obtained by any the counters in the 51 steps. The comparator output 294 is connected to an enable input of a data gate 298. The output of the step counter 278 is connected to the data input of the data gate 298. The output of the data gate 298 is connected to a vertical shift data output stage 300 that provides a vertical shift in row value signal 132 of the maximum value detector 128. When the comparator 290 transfers the contents of register C to register D, the data gate 298 is enabled to provide the step number corresponding to the vertical shift in rows to the output stage 300.

In an alternate embodiment of the maximum value detector 128, the registers 288 and 292 and the comparator 290 are omitted. The vertical shift in rows at 132 is obtained as before from the data gate 298. However, in the alternate embodiment, the second input to the data gate 298 is connected to the output 244 of the comparator 238 instead of the output 294 of the comparator 290. The horizontal shift at 130 is obtained as discussed previously. The alternate embodiment provides reduced computation time of operation while the embodiment of FIG. 16 illustrates operation on a conceptual, functional step by step basis.

Figure 17:
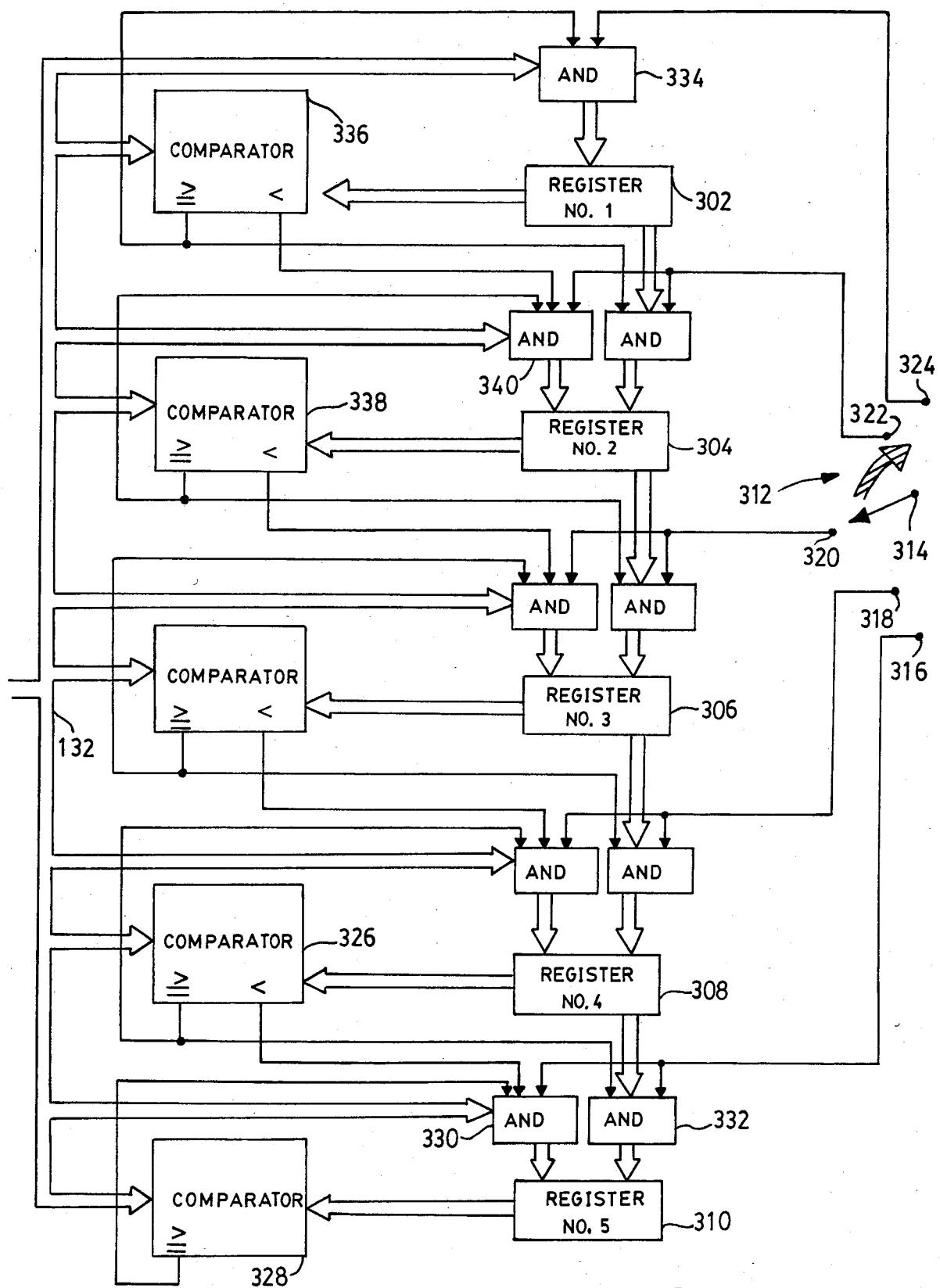
FIG. 17 is a logic and block diagram representation of portions of the position deviation detecting system of FIG. 14 illustrating the details of the median value detector.

Referring now to FIG. 17 and considering the detailed structure and operation of the median value detector 134, the specific embodiment of FIG. 17 illustrates a system wherein 5 actual images are taken and compared with the reference image with each image comparison including the 51 steps of operation. One median value detector 134 as illustrated in FIG. 17 is provided for the vertical shift signal 132 and a second median detector is provided for the horizontal shift signal 130. For example, consider that the illustrated median value detector in FIG. 17 is for the vertical shift value with data input at 132. In the initial condition the contents of each of the five registers 302, 304, 306, 308 and 310 referred to respectively as registers 1 through 5 is equal to 0.

The scanner arrangement 312 is provided to connect an enable signal at 314 sequentially to each of five enable output lines 316, 318, 320, 322, and 324. The scanner 312 initially is set to enable the scanner enable output line 316. Now for discussion purposes, consider that the data inputs at 132 corresponding to 5 successive actual image comparisons results in vertical shift data of +5, +3, +4, +1, and +2. After the first image comparison by operation of the maximum value detector 128, the data input equal to +5 is simultaneously compared with the contents of registers 308 and 310 by the comparators 326 and 328 respectively. In the specific example, the And gate 330 is not enabled because the input from comparator 326 is not high. Thus, the contents of register number 4 are transferred to register 5 by means of the data gate 332.

The scanner 312 is then set to enable the output line 318. In this position, the contents of register 3 are transferred to register number 4. In the respective scanner positions to enable lines 320 and 322, the contents of register number 2 are transferred to register number 3 and the contents of register number 1 are transferred to register number 2. With the scanner in the 324 enable position, the +5 data is loaded into the register number 1.

Thus, the scanner 312 sequentially enables outputs 316 through 324 while the +5 data is present at 132 at the end of the first actual image comparison.

Next, after the second image comparison, the +3 data is inputted and the scanner 312 again scans the enable lines 316 through 324. With the scanner in position 316, the contents of register number 4 are transferred to register number 5. Further, in the scanner positions 318 and 320, the contents of register number 3 is transferred to register number 4 and the contents of register number 2 is transferred to register number 3 respectively. With the scanner in position 322, the +3 data is transferred to register number 2. Further in the 324 scanner position, no data transfer takes place and the data gate 334 is not enabled since the output from comparator 336 is not positive due to the fact that the +3 data is not greater than or equal to the +5 data from register number 1. Thus, at the end of second image comparison, register 1 contains a +5, register 2 contains a +3 and the remaining three registers are 0.

After the third image comparison, the +4 data is entered at 132 and the scanner 312 again operates to scan the enable positions 316 through 324. In the scanner position 316, the contents of register number 4 are transferred to register number 5. In scan position 318, the contents of register number 3 are transferred to register number 4. With the scanner in position 320, the +3 data in register number 2 is transferred into register number 3 since the output of comparator 338 is positive with the comparison of +4 data at data input 132 being greater than or equal to the +3 data previsouly in register number 2.

With the scanner in position 322, the +4 data is transferred into register number 2 with the data gate 340 being enabled since the output from comparator 336 is high with +5 input from register number 1 being greater than the data input at 132 with value +4. Further, the input to the data gate 340 from the comparator 338 is also a high level since the data input at 132 of +4 is greater than the previous +3 contents of register number 2. With the scanner in position 324, the contents of register number 1 are unchanged since the comparator 336 does not provide a high output to the gate 334 and the gate 334 is disabled since +4 is not greater than +5.

Thus at the end of the third image comparison and operation of the scanner 312, the register contents are as follows: register 1, +5; register 2, +4; register 3, +3; register 4, 0; register 5, 0.

After the fourth image comparison the data +1 is input at data input 132 and after operation of the scanner 312, the data in registers 1 through 5 respectively are +5, +4, +3, +1 and 0. After the fifth image comparison and operation of the scanner 312 and the input of data +2 at the data input 132, the +1 contents previously in register number 4 is transferred to register number 5. Further the +2 data at 132 is loaded into register number 4 with the scanner 312 in the position 318 since the comparison in comparator 326 results in +2 being greater than +1 and the data gate 332 is enabled.

Thus, it can be seen that the median value of the data is placed in register number 3 and this data is output at 136 as the vertical shift in rows to the system controls 94. Thus, the median detector 134 serves to place the median value of a sequential series of 5 data values at 132 into register number 3 in accordance with the structure of the median detector in the foregoing discussion.

Figure 18:
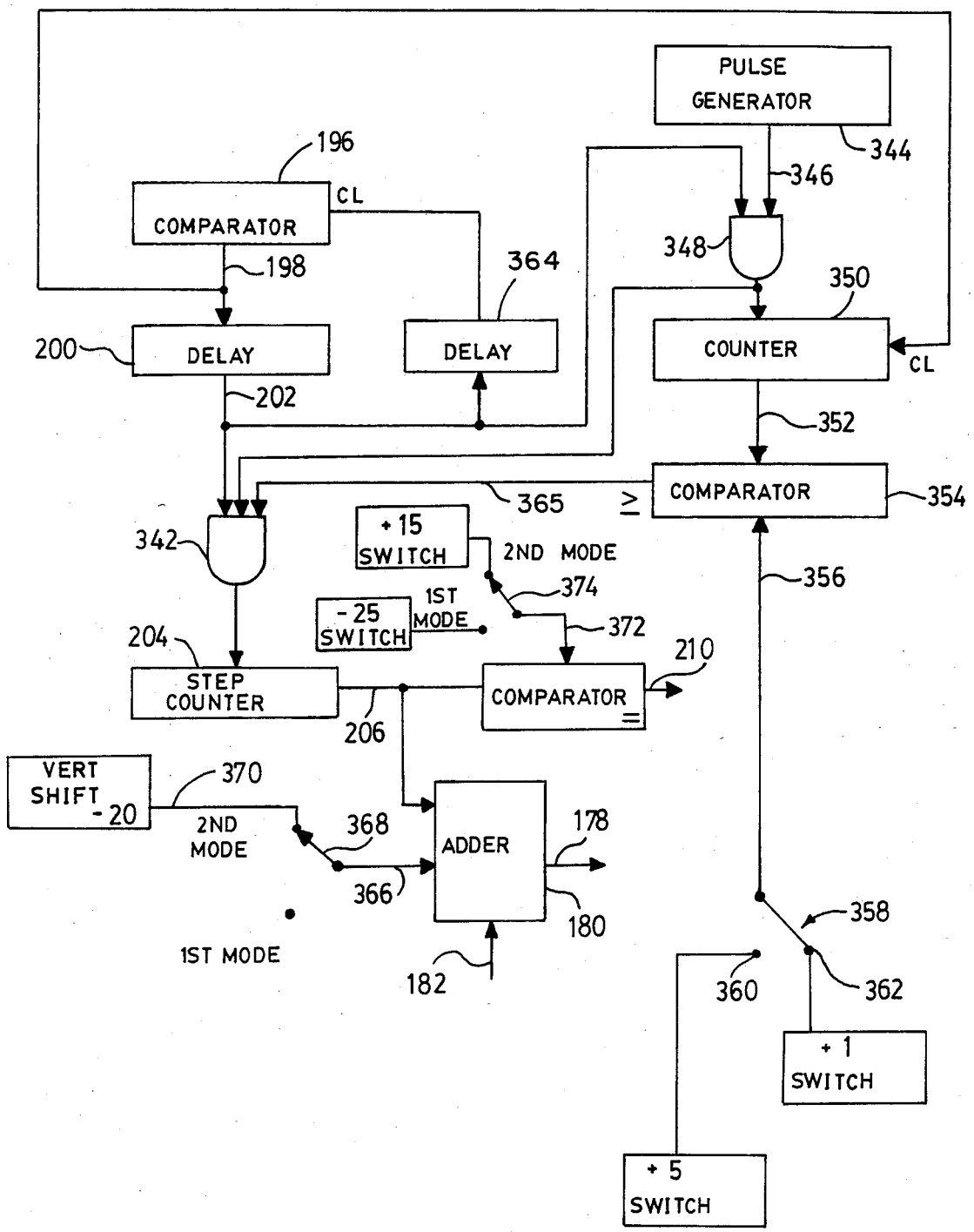
FIG. 18 is a logic and block diagram representation of portions of the position deviation detecting system of FIG. 14 and illustrating additional arrangements to accomplish double shifting mode operation.

Referring now to FIG. 18 and considering an alternative embodiment to the position deviation detecting system of FIGS. 14 and 15, to incorporate double shifting mode operation, the structure of FIG. 15 is modified as shown in FIG. 18 wherein like reference numerals refer to the same elements as FIG. 15. In a double shifting mode of operation to provide improved efficiency, the vertical shifting in a first approximate shifting mode is increased to 5 rows between each step instead of 1 row. The first shifting mode provides an approximate vertical shift value for maximum correlation defining a range of ±5 rows shifting within which the maximum correlation will be contained. After the vertical shifting range of maximum correlation value is found in the first shifting mode, in a second shifting mode the incremental shifting and correlation calculation is performed with one row vertical shifting increments in the range ± five rows about the approximate vertical shifting value obtained in the first shifting mode.

Accordingly, a three input AND gate 342 is provided that includes the "end of step" output 202 as one input. The output of the AND gate 342 is connected to the count input of the step counter 204. A pulse generator 344 is provided to generate a pulse output at 346. The pulse output 346 is connected to one input of a 2 input AND gate 348. The second input to the AND gate 348 is connected to the end of step signal 202. The output of the AND gate 348 is connected to a second input of the AND gate 342 and also to the count input of a counter 350. The data output 352 of the counter 350 is connected to an A input of a comparator stage 354. A second B input 356 of the comparator 354 is connected to a two position switch arrangement 358. In a first mode position, the switch 358 connects the B input 356 to a +5 reference input at 360. The switch 358 in the second mode position connects a +1 value reference at 362. The output 364 of the comparator 354 is connected to the third input of the AND gate 342.

The output 364 of the comparator 354 provides a high level signal when the B input is greater than or equal to the A input. Thus, after 5 pulses have been input to the counter 350 and passed by the gate 342 to the step counter 204, comparator output 364 is a low level that disables the gate 342 from passing any further pulses to the step counter 204. The output 198 of the comparator 196 is supplied as a clear signal to the counter 350. The end of step signal 202 is connected through a delay element 365 to provide a clear input to the comparator 196. During the enable time of the end of step signal 202, five pulses from the pulse generator 344 are passed through the AND gate 342 and into the counter 204. When the comparator 196 is cleared or reset, the output of the comparator 198 clears the counter 350 for the next shift by 5 rows.

Thus, for each successive correlation step between the reference image and the actual image, the reference image is shifted by 5 rows each step for the next comparison with the actual image. Correspondingly, the output 206 of the counter 204 after each step is decremented by 5 rows. The adder stage 180 in addition to the input 206 from the step counter 204 and the input 182 from the actual counter 184 also includes a third input 366 connected by a switch 368 to a 0 reference input in the first shifting mode of operation for shifting by 5 rows. In the second shifting mode of operation, the switch 368 is connected at 370 to a vertical shift reference input of −20. The comparator 208 includes a reference input at 372 connected by a switch 374 in the first shifting mode position to a −25 reference value and in the second shifting mode to a +15 reference value.

Thus, in the first shifting mode of operation, the row address output 178 of the adder 180 implements the steps by shifting five rows each step to perform the comparisons of shifted reference images in steps A, B, C, D, E, F, G, H, I, J and K that were previously performed as steps 1, 6, 11, 16, 21, 26, 31, 36, 41, 46 and 51 in the arrangement of FIG. 15. Thus, the first shifting mode determines the approximate range of shifting for maximum correlation in 11 steps instead of 51 steps with a resultant efficiency of computation time compared to the previous operation of FIG. 15.

With the switches 358, 368 and 374 in the first switching mode positions for 5 row shifts for each step of operation, the horizontal shfit value at 130 and the vertical shift value at 132 are determined by the maximum value detector 128; after the 11 steps of operation the step counter 204 being reset when the counter output 206 reaches −25 by means of the comparator 208 outputting the signal 210 through the delay stage 212 and the clear signal 214. Next the system is switched to the second shifting mode of operation for one row shifting and is set to operate over the vertical shifting range of ±5 rows with 1 row shifts per step about the vertical shifting value at 132 obtained from the first shifting mode.

For example, if the vertical shifting value at 132 for the first shifting mode resulted in a maximum correlation value −10 rows, the input 366 to the adder 182 would be equal to −10 −20=−30. Thus, the row address signal 178 from the adder 180 would start at −5 and continues through −15. The correlation calculations would end when the counter 204 reached −15 since the comparator 208 would output the high signal at 210 with the second input to the comparator 372 in the second shifting mode being +15. Thus, the first shifting mode with shifts of 5 rows per step obtains an approximate maximum correlation value corresponding to a given vertical shifting value and in the second shifting mode the maximum correlation degree is calculated over the range of shifting of ±5 rows about the approximate maximum shifting value obtained in the first mode.

Referring now to FIG. 19 and considering a bright picture element checking unit useful in alternative embodiments for applications where optical noise is present, it is desirable in such applications to check the actual image obtained by the TV camera 50 to determine if a valid image has been obtained in order to prevent undesireable correlation calculations that would result in invalid shifting data.

A counter 371 is connected to the data output of the TV camera 50 to count the number of bright picture elements obtained in the actual image. The output of the counter 371 is connected to one input of a comparator 373. A second input to the comparator 373 is connected at 375 to a reference input equal to the limit number of bright picture elements which could validly be encountered in an actual image including a number of invalid picture elements due to optical noise. For example, if there are 500 valid bright picture elements for a given image pattern, the limit value might be set at 600 allowing for 100 picture elements of invalid optical noise before making a decision not to continue with correlation calculation.

Thus, the limit number 600 is utilized as a reference input at 375 if analysis indicates that +100 pictures elements due to optical noise would not invalidate the correlation calculations. The comparator 373 provides a positive output at 376 when the number of bright picture elements in the counter is less than the limit number of 375 to enable an AND gate 378.

Thus, when the system controller 94 has completed the storage of an actual image and generates a calculation start signal at 380 to enable the position detection system to perform correlation calculations, the gate 378 provides an enable signal at one input of each of two data gates 382 and 384. The second input of each of the data gates 382 and 384 are connected respectively to the outputs of the actual image 108 and the template reference image memory 104. The output of the gate 382 is connected to provide data to the AND gate array 124. The output of the data gate 384 is connected to provide template data to the shift register stages 122.

Thus, when the actual image contains less than the limit number of bright picture elements, the correlation calculations are enabled and the data from the template memory and the actual image memory are supplied to the position detection system for completion of correlation calculations.

While there has been illustrated and described several embodiments of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. Apparatus for detecting the positional deviation of an object with respect to a reference position comprising:

means for storing data representing a reference image in a data array format of data elements with the object at a reference position;

object image storing means for acquiring and storing data representing an image of the object in a data array format of data elements;

means responsive to said stored data in said reference image storing means and said object image storing means for comparing respective corresponding portions of said reference image and said object image on a data element by data element basis at a predetermined number of shifted positions of said reference image with respect to said object image to obtain the correlation between said data at said shifted positions, said comparing means comprising means for serially reading out said reference image data elements and said object image data elements and means for simultaneously and in parallel calculating the correlation for each of said shifted positions; and deviation detecting means for determining the shifted position at which the maximum correlation is obtained between said reference image and said object image, said shifted position at which the maximum correlation is obtained representing the deviation between said reference position and said object position, said deviation detecting means being responsive to said comparing means.

2. The apparatus of claim 1 wherein said shifted positions are incrementally displaced one from another in one or more direction defined by the coordinate axes of said object image.

3. The apparatus of claim 1 wherein said shifted positions are defined by incrementally displaced rotational shifts of said reference image with respect to said object image.

4. The apparatus of claim 1 wherein said reference image data array format of data elements are arranged in m columns and n rows, said object image data array format of data elements being arranged in M columns and N rows, where M is greater than m and where N is greater than n, said simultaneous and parallel calculating means further comprising a predetermined number of correlation accumulating means equal in number to M−m+1, said comparing means being operative over N−n+1 defined steps of operation, said serially reading out means being operative to read out said reference image data and said object image data in a serial manner row by row during each of said defined steps of operation, each of said correlation accumulating means after each defined step of operation including a correlation value for a different shifted position of N−n+1 total shifted positions representing the incremental shifting of said reference image by 1 column, each of said defined steps of operations representing the incremental shifting of said reference image by one row.

5. The apparatus of claim 1 wherein said shifted positions are defined by parallel transformation and rotation of said reference image with respect to said object image.

6. The apparatus of claim 1 further comprising means for controlling said serially reading out means to successively read out said reference image data elements and predetermined elements of said object image data elements, each read out corresponding to said shifted positions of said refrence image with respect to said object image along a first dimension of said object image data array format, each successive read out corresponding to different shifted positions of said reference image with respect to said object image at a different point along a second dimension of said object image data array format, said controlling means controlling said serially reading out means to read out said predetermined elements of said object image for each read out that correspond to the data elements overlaid by said reference image at each of said respective shifted positions for the respective read out.

7. The apparatus of claim 1 further comprising step control means for controlling operation of said comparing means in a predetermined plurality of defined steps of operation, said step control means controlling said serially reading out means to read out said reference image data elements once during each step and to read out a different predetermined portion of said object image data elements during each step, each step corresponding to a different position of said reference image with respect to said object image in a first direction and shifting of said reference image with respect to said object image in a second direction in a plurality of shifted positions.

8. The apparatus of claim 1 wherein each of said reference image data and said object image data are arranged in image frames being defined by respective predetermined frames having image data points arranged in a predetermined number of columns and a predetermined number of rows, each of said image data points including data representing the intensity of said respective image point.

9. The apparatus of claim 1 or 8 wherein said serially reading out means comprises means for reading out said complete reference image data in a serial fashion and for reading out a predetermined portion of said object image data in a serial fashion during a defined step of operation, said predetermined portion of said object image data being defined by the portion overlaid by said shifted positions of said reference image with respect to said object image that are compared by said comparing means in said defined step of operation of said apparatus.

10. The apparatus of claim 9 wherein said comparing means compares said reference image data with said object image data on an image point by image point basis such that each image point of said reference image and each image point of said predetermined portion of said object image are compared that correspond to respective overlying positions of said reference image and said object image defined by said shifted positions in said defined step of operation.

11. The apparatus of claim 9 wherein said comparing means is operated over a predetermined plurality of said defined steps of operation, in each step of operation said comparing means comparing said reference image and the overlied portions of said object image at a predetermined plurality of shifted positions along a first coordinate axis of said object image frame, in each successive step of operation said comparing means comparing said reference image and the overlied portion of said object image at a predetermined plurality of shifted positions different from said shifted positions of previous steps as defined along a second coordinate axis of said object image frame.

12. The apparatus of claim 1 wherein said simultaneous and parallel calculating means comprises shift register means having a plurality of stages for successively shifting data received at a data input, said read out reference image data being connected to said data input and said shift register means performing a data shift upon the occurrence of each serial data bit at said data input, said simultaneous and parallel calculating means further comprising correlation accumulating means responsive to the data in said plurality of stages of said shift register means and having an object data input connected to said serially read out object image data for accumulating a count representing the correlation between said compared reference image and said object image at each of said predetermined number of shifted positions.

13. The apparatus of claim 12 wherein said deviation detecting means comprises maximum value detector means responsive to said correlation accumulating means for comparing each of said correlation counts and for outputting shift data representing the incremental shift between said reference image and said object image that results in the maximum correlation count accumulated by said correlation accumulating means.

14. The apparatus of claim 13 wherein said data reading out means further comprises means for reading out said reference image data once during a defined step of operation and for reading out the portion of said object image data that corresponds to the object image portions overlied by said reference image over said predetermined number of shifted positions during a defined step of operation, said correlation accumulating means simultaneously accumulating said correlation count for each of said predetermined number of shifted positions during a defined step of operation.

15. The apparatus of claim 14 wherein said object image acquiring means is operative to acquire a plurality p frames of object image data, said maximum value detector means being operative to successively output shift data representing the shifted positions resulting in the maximum correlation value over said plurality of defined steps of operation for each of said plurality of object images, said apparatus further comprising median value detector means responsive to said maximum value detector means for generating an output representing the shifted position equal to the median value of said plurality of maximum correlation values for said plurality of object images.

16. The apparatus of claim 14 wherein said correlation accumulating means comprises double shifting mode control means for operating said apparatus to determine an approximate maximum correlation count in a first shifting mode wherein each of said first shifting mode steps of operation corresponds to a shift in said second coordinate axis equal to a predetermined multiple number of incremental shifts nt where t is the incremental shift for a defined step of operation and n is the predetermined multiple, said double shifting mode control means further comprising second shifting mode means responsive to the maximum correlation count in said maximum value detector means for operating said apparatus in a second shifting mode wherein said second shifting mode steps of operation correspond to incremental shifts t, said shifting range of operation of said second shifting mode being equal to 2nt over 2n defined second shifting mode steps of operation centered about the shifted position corresponding to the approximate maximum correlation count obtained from said first shifting mode.

17. The apparatus of claim 14 wherein said apparatus is operable in a predetermined number of said defined steps of operation, each of said defined steps of operation corresponding to a predetermined number of shifted positions of said reference image with respect to said object image along a first coordinate axis of said object image, successive defined steps of operation corresponding to incrementally shifted positions of said reference image with respect to said object image along a second coordinate axis of said object image.

18. The apparatus of claim 17 wherein said maximum value detector means further comprises step means for determining the maximum correlation value obtained over said total number of defined steps of operation.

19. The apparatus of claim 14 or 17 wherein said correlation accumulating means further comprises a plurality of counter means equal in number to said number of shifted positions in each defined step of operations.

20. The apparatus of claim 19 wherein each of said counter means includes a first input connected to a corresponding respective one of said shift register stages and a second input connected to said output data input.

21. The apparatus of claim 20 wherein each of said counter means accumulates said correlation count for a corresponding respective one of said predetermined number of shifted positions.

22. The apparatus of claim 21 wherein each of said counter means is advanced in count whenever the inputted reference image data and the object image data exhibit a predetermined combinational binary relationship.

23. The apparatus of claim 22 wherein said maximum value detector means comprises current step comparator means for comparing the value of an input with a previously stored value and for storing the maximum value of said input value or said previously stored value and means for sequentially connecting the output of each of said counter means to said input of said current step comparator means.

24. The apparatus of claim 23 wherein said maximum value detector means further comprises total step comparator means for comparing said stored value in said current step comparator means for all of said defined steps of operation and for storing the maximum value.

25. The apparatus of claim 24 wherein said maximum value detector means further comprises first means for storing the number of said counter that corresponds to said stored maximum value in said current step comparator means and second means for storing the step number that corresponds to said maximum value stored in said total step comparator.

26. The apparatus of claim 25 wherein said counter number corresponds to said shift along said first coordinate axis and said step number corresponds to said shift along said second coordinate axis.

27. The apparatus of claim 1 further comprising valid object image checking means responsive to said object image data and a valid limit input for determining if the object image data represents a valid image capable of being accurately utilized by said apparatus to determine the maximum correlation and the deviation between said reference position and said object position.

28. The apparatus of claim 27 wherein said valid object image checking means comprises means responsive to said object image data storing means for accumulating the total count of image data points in said object image that have a predetermined binary intensity status and valid comparing means for comparing said valid limit input with said accumulated count, said valid comparing means comprising means for inhibiting correlation operation of said apparatus when said accumulated count exceeds said valid limit input.

29. A method of detecting any positional deviation of an object from a reference position with the aid of an image sensor, the method comprising the steps of:
   obtaining reference image data of an object in a data array format of data elements representing the orientation of the object at a reference position;
   obtaining object image data of the object by means of the image sensor in a data array format of data elements;
   comparing respective corresponding portions of the object image data and the reference image data on a data element by data element basic at a predetermined number of shifted positions of the reference image relative to the actual image to obtain the correlation between the data at the shifted positions, said comparing step comprising the steps of serially reading out said reference image data and said object image data and simultaneously and in parallel calculating the correlation of said shifted positions; and
   determining the shifted position at which the maximum correlation is obtained between said reference image and said actual image over said predetermined number of shifted and compared positions.

30. The method of claim 29 wherein said predetermined number of shifted positions are defined by parallel transformations and/or rotations.

31. A method of detecting any positional deviation of an object from a reference position with the aid of an image sensor, the method comprising the steps of preparing reference image information as data elements in a data array; obtaining image information of the object as data elements in a data array by means of the image sensor; subjecting one of said two sets of information to a plurality of linear, incremental parallel transformations in predetermined increments in at least two directions by serially reading out said data elements of said object and reference image information; simultaneously and in parallel detecting the correlation degree between said two sets of information for each incremental parallel transformation in a first of said two directions by comparing respective overlaid data elements of said object and reference image information; repeating said detecting step for each linear incremental parallel transformation in said second direction; and selecting the maximum correlation degree from among the so obtained correlation degrees to determine the positional deviation of the object from the reference information on the basis of the amount and the direction of the parallel transformation which gives the maximum correlation degree.

32. A method as set forth in claim 31 in which said reference information and said information of the object comprise a plurality of information bits and are converted into corresponding binary information, respectively, and one of the two sets of information thus treated is subjected to the parallel transformation and is compared bit by bit with the other set of binary information which remains in the original state to count the correlation degree determined by the positionally corresponding bits which are in the same predetermined condition in the two sets of binary information.

33. A method as set forth in claim 32 in which said predetermined condition is the binary number 1.

34. A method as set forth in claim 32 in which said predetermined condition is the binary number 0.

35. A method as set forth in claim 32 in which said predetermined condition is the binary number 1 or 0.

36. A method as set forth in claim 32 in which said image sensor is a television camera and said two sets of binary information each comprises a plurality of black-and-white picture elements, and in which said binary reference information is subjected to a parallel transformation and is compared with the binary image information of the object to detect, as the correlation degree, how many picture elements in the same coordinate positions are in the same predetermined optical condition.

37. A method as set forth in claim 36 in which said predetermined optical condition is only the white state.

38. A method as set forth in claim 36 in which said predetermined optical condition is only the black state.

39. A method as set forth in claim 36 in which said predetermined optical condition is either the white state or the black state.

40. A method as set forth in claim 32 or 36 in which the frame of the reference information is reduced by a predetermined maximum amount of the parallel transformation in each direction of the coordinate plane on which the reference information exists.

41. An apparatus for detecting the positional deviation of an object from a reference position comprising a first memory for storing binary reference image information; first reading means for reading out the binary reference information from said first memory; image sensor means for detecting an object to provide image information of the object into corresponding binary information to supply the binary information to a second memory; second reading means for reading out the binary information of the object from said second memory; means responsive to the binary reference image information from the first reading means and the binary image information of the object from the second reading means for simultaneously and in parallel calculating the correlation degree between the two sets of information as determined by a comparison of the corresponding binary information of said two sets of information represented by different shifted positions of said reference image information with respect to said object image information; and means responsive to the correlation degree thus obtained for determining the positional deviation of the object from the reference position.

42. An apparatus as set forth in claim 41 wherein said second reading means further comprises second reading control means for successively reading out said object image information stored in said second reading means with each successive read out of the object image information starting from a different point of said object image.

43. An apparatus as set forth in claim 42 further including a third memory for storing a very large amount of reference information, third reading means for reading out one frame of reference information from said third memory to supply it to said first memory.

44. An apparatus as set forth in claim 41, 42 or 43 further including shift register means having one input adapted to receive the binary reference information through said first reading device, said shift register means having a plurality of stages, said calculating means including calculating units of the same number as the number of the stages of said shift register means, each calculating unit having a first input connected to the output of the corresponding stage of said shift register means and a second input adapted to receive the binary information of the object from said second reading device, said calculating units being effective to simultaneously calculate the correlation degrees corresponding to different incremental parallel shiftings of the reference information in accordance with the operation of said shift register means.

45. Apparatus for detecting the positional deviation of an object with respect to a reference position comprising:
  means for storing data representing a reference image with the object at a reference position;
  object image storing means for acquiring and storing data representing a plurality of images of the object;
  means responsive to said stored data in said reference image storing means and said object image storing means for comparing said reference image and each of said object images at a predetermined number of shifted positions of said reference image with respect to each of said object images to obtain the correlation between said data at said shifted positions;
  deviation detecting means for determining the maximum correlation value and the corresponding shifted position at which the maximum correlation is obtained between said reference image and each of said object images, said shifted position at which the maximum correlation is obtained representing the deviation between said reference position and said object position, said deviation detecting means being responsive to said comparing means; and
  median value detector means responsive to said deviation detecting means for generating an output representing the shifted position determined by the median value of said plurality of said maximum correlation values for said plurality of object images.

46. The apparatus of claim 45 wherein said median value detector means comprises means for successively comparing said deviation of said shifted position for each of said object images at which the maximum correlation is obtained, for ordering each of said deviations in numerical order and for selecting and outputting the middle value of said deviations.

47. The apparatus of claim 46 wherein said deviation representing said shifted position includes two dimensions, said apparatus comprising median value detector means for each of said two dimensions.

48. Apparatus for detecting the positional deviation of an object with respect to a reference position comprising:
  means for storing data representing a reference image in a data array format of data elements with the object at a reference position;
  object image storing means for acquiring and storing data representing an image of the object in a data array format of data elements;
  means responsive to said stored data in said reference image storing means and said object image storing means for comparing respective overlying portions of said reference image and said object image on a data element by data element basis at a predetermined number of shifted positions of said reference image with respect to said object image and for outputting the correlation value for each of said shifted positions representing the correlation between said data at said shifted positions; and
  maximum value detecting means responsive to said correlation values for determining the shifted position at which the maximum correlation value is obtained and for outputting shift data representing the incremental shift between said reference image and said object image that results in said maximum correlation value, said shift data defining the deviation between said reference position and said object, said maximum value detecting means comprising means for sampling each of said correlation values, means for successively comparing each sampled correlation value with the highest previous sampled correlation value, means for storing said highest sampled correlation value and means for storing the shift data corresponding to said highest correlation value.

49. Apparatus for detecting the positional deviation of an object with respect to a reference position comprising:
  means for storing data representing a reference image in a two dimension data array format of data elements with the object at a reference position;
  object image storing means for acquiring and storing data representing an image of the object in a two dimension data array format of data elements; and
  means responsive to said stored data in said reference image storing means and said object image storing means for comparing predetermined array size portions of said reference image and said object image at a plurality of shifted positions with respect to each other over said two dimensions in a first coarse mode of operation and a second fine mode of operation, said comparing means comprising means for outputting the correlation value for each of said shifted positions representing the correlation between said data at said shifted positions, said first coarse mode of operation including a first predetermined number of shifted positions mn over a full range of shifting of said reference image and said object image, where m corresponds to a number of positions in a direction along a first dimension of said object data array format and n corresponds to a number of equally spaced apart positions in a direction along the second dimension of said object data array format, where each of said n positions are spaced apart by q shifted positions of said reference image and said object image along said second dimension, said second fine mode of operation including a second predetermined number of shifted positions $(2q+1)m$ of said reference image and said object image arranged about the shifted position of said first coarse mode of operation that results in the highest correlation value during said first mode of operation, said comparing means further comprising means for serially reading out said reference image data elements and said object image data elements and means for simultaneously and in parallel calculating the correlation for each of said shifted positions m along said first dimension in a defined step of operation, said apparatus further comprising step control means for controlling operation of said comparing means in n steps of operation in said first coarse mode and in $2q+1$ steps of operation in said second fine mode.

50. Apparatus for determining the positional deviation of an object with respect to a reference position comprising:
  means for storing data representing a reference image in a two dimensional array format of data elements with the object at a reference position;

object image storing means for acquiring and storing data representing an image of the object in a two dimensional array format of data elements; and means responsive to said stored data in said reference image storing means and said object image storing means for comparing respective overlying portions of said reference image and said object image on a data element by data element basis and for outputting the correlation value representing the correlation between said data, said comparing means comprising double shifting mode means for comparing said data in a first shifting mode operation at a first predetermined number of shifted positions of said reference image with respect to said object image over a predetermined full range of shifted positions and outputting corresponding correlation values and for comparing said data in a second shifting mode of operation at a period predetermined number of shifted positions of said reference image with respect to said object image over a predetermined range of shifted positions defined about one of said first predetermined number of shifted positions; and deviation detecting means responsive to said comparing means and said outputted correlation values during said first shifting mode operation for detecting the shifted position of said first predetermined number at which the highest correlation value is obtained and for determining the maximum correlation value during said second shifting mode operation and the corresponding shifted position representing the deviation between said reference position and said object position, said comparing means being responsive to said deviation detecting means during said second shifting mode operation to determine said one of said first predetermined number of shifted positions, each of said reference image data and said object image data being arranged in image frames having a predetermined number of data elements in a two dimensional array defined by two coordinate axes, said first and second predetermined number of shifted positions being along a first of said coordinate axes, said comparing means including means operative at each of said first predetermined number of shifted positions and each of said second predetermined number of shifted positions to compare said respective reference image data and said object image data simultaneously and in parallel over a predetermined number of shifted positions along said second coordinate axis.

51. Valid object image checking apparatus for image processor apparatus of the type that compares acquired object image data with stored reference image data comprising valid object image means responsive to the object image data and a valid limit input for determining if the object image data represents a valid image capable of being accurately utilized by the image processor apparatus, said valid object image determining means comprising means responsive to the object image data for accumulating the total count of image data points in the object image that have a predetermined binary intensity status and valid comparing means for comparing said valid limit input with said accumulated count, said valid comparing means comprising means for generating an image processor apparatus inhibit signal when said accumulated count exceeds said valid limit input.

52. Image processor apparatus for determining the positional deviation of an object with respect to a reference position comprising:

means for storing data representing a reference image in a data array format of data elements arranged in at least two dimensions with the object at a reference position;

means for storing data representing an image of an object in a data array format of data elements arranged in at least two dimensions;

means for comparing respective overlying portions of said reference image data and said object image data on a data element by data element basis at a predetermined number of shifted positions in said two dimensions of said reference image with respect to said object image to obtain the correlation between said data at each of said shifted positions, said correlation being defined by the sum of all individual comparisons of corresponding overlying data elements of said reference image and said object image at each of said shifted positions, said comparing means being operative over a predetermined number of steps of operation corresponding to n shifted positions in a first of said two dimensions of said arrays, said comparing means further comprising means operative during each step of operation to obtain the correlation between overlaid portions of said reference image data and said object image data for a predetermined number p of shifted positions in said second dimension, said comparing means further comprising means responsive to said p times n correlations to provide the shifted position in said two dimensions at which the correlation is maximum, said shifted position representing the deviation between said reference position and said object position, said comparing means further comprising means operative during each of said n steps of operation for shifting said overlying portion of said reference image and object image data elements and simultaneously and in parallel accumulating said correlations for each of said p shifted positions.

53. The image processor apparatus of claim 52 wherein said n shifted positions are equally spaced in said first dimension and said p shifted positions are equally spaced in said second dimension, said shifted position corresponding to the maximum correlation being defined by one of said n positions along said first dimension and one of said p positions along said second dimension.

54. The image processor apparatus of claim 52 further comprising means for serially reading out said reference image data bit by bit and row by row and means for simultaneously and synchronously serially reading out said object image data bit by bit and row by row, said comparing means further comprising shift register means having p stages for successively shifting data received at a data input, said read out reference image data being connected to said data input and said shift register means performing a data shift upon the occurrence of each serial bit, said comparing means further comparing correlation accumulating means having p stages, each of said p correlation accumulation stages being connected to be responsive to the data in a respective one of said p shift register stages, each of said p correlation accumulation stages having an object data input connected to said serially read out object information data, each of said p correlation accumulation stages accumulating a count representing the correlation between said reference image and said object image corresponding to a different one of said p shifted positions, said object image in said second dimensions having p data elements more than said reference image, said reference image data read out means and said object image data read out means being operative during each step n of operation to read out said respective reference image data of said object image data.

55. The image processor apparatus of claim 54 wherein said comparing means further comprises means responsive to said p correlation accumulator stages for determining over said n steps of operation the correlation accumulator stage that provides the maximum correlation count and the step n during which said correlation accumulation stage provided the maximum correlation count.

56. The image processor of claim 55 wherein said object image data includes n data elements more than said reference image data in said first dimension.

57. Apparatus for obtaining the deviation between a position represented by an object image from a reference image position, the object image and the reference image each being defined by an array of data elements in at least two dimensions, the object image array including a greater number of data elements than said reference image array in at least one dimension, the apparatus comprising:
  object image read out means having stored therein said object image array for serially reading out said data elements defining said object image array;
  reference image read out means having stored therein said reference image array for serially reading out said data elements defining said reference image array;
  means responsive to said serial read-out data from said object image read out means and said reference image read out means for simultaneously and in parallel calculating the correlation values between said respective data elements of said reference image and said object image corresponding to a plurality of shifted positions of said reference image with respect to overlaid corresponding portions of said object image in said one dimension by comparing said respective data elements of said object image and said reference image; and
  means responsive to said correlation values for detecting the deviation between said object image and said reference image on the basis of the shifted position that results in the maximum correlation value.

58. The apparatus of claim 57 wherein said correlation value calculating means comprises shift register means having said serially read out reference image data elements connected at a data input and a plurality of shift register stages equal in number to said plurality of shifted positions and correlation accumulator means responsive to said data in said shift register stages and said serially read out object image data elements, said object image read out means and said references image read out means being controlled by said comparing means to read out data on a data element by data element basis in a synchronous manner, said shift register means shifting data through said shift register stages by one shift upon the occurrence of each read out data element.

59. The apparatus of claim 57 wherein said object image array includes a larger number of data elements than said reference image array in said second dimension, said apparatus further comprising step means for operating said comparing means for a plurality of steps corresponding to different shifted positions corresponding to shifting of said reference image with respect to said object image in said second dimension.

60. The apparatus of claim 59 wherein said step means further comprises means for controlling the object image read out means to start the read out of said object image data elements corresponding to the overlied portions of said object image by said reference image for said different shifted positions in said second dimension for each of said steps of operation.

61. The apparatus of claim 57 further comprising coordinate rotating means for rotating said reference image array as stored in said reference image read out means.

62. The apparatus of claim 57 further comprising coordinate rotating means for rotating said reference image array relative to said object image array for storage as said image array data in one of said respective object image read out means or said reference image read out means.

63. Apparatus for detecting the positional deviation of an object with respect to a reference position comprising:
  means for storing data representing a reference image in a data array format of data elements with the object at a reference position;
  object image storing means for acquiring and storing data representing an image of the object in a data array format of data elements;
  means responsive to said stored data in said reference image storing means and said object image storing means for comparing respective overlying portions of said reference image and said object image on a data element by data element basis at a predetermined number of shifted positions of said reference image with respect to said object image to obtain the correlation between said data at said shifted positions; and
  deviation detecting means for determining the shifted position at which the maximum correlation is obtained between said reference image and said object image, said shifted position at which the maximum correlation is obtained representing the deviation between said reference position and said object position, said deviation detecting means being responsive to said comparing means, said comparing means comprising means for reading out said data from said reference image storing means and said object image storing means in a predetermined manner and means for comparing said read out data in a predetermined manner, said reference image data representing a reference image frame of elements arranged in m columns and n rows, said object image data representing an object image frame of elements being arranged in M columns and N rows, where M is greater than m and where N is greater than n, said data of each of said frames being read out and compared on an element-by-element basis, said comparing means further comprising a predetermined number of correlation accumulating means equal in number to $M-m+1$, said comparing means being operative over $N-n+1$ defined steps of operation, said data reading out means being operative to read out said reference image frame data and said object image frame data in a serial manner row by row during each of said defined steps of operation, each of said correlation accumulating means after each defined step of operation including a correlation value for a different shifted position of N−n+1 total shifted positions representing the incremental shifting of said reference image by 1 column, each of said defined steps of operations representing the incremental shifting of said reference image by one row.

64. Apparatus for detecting the positional deviation of an object with respect to a reference position comprising:

means for storing data representing a reference image in a data array format of data elements with the object at a reference position;

object image storing means for acquiring and storing data representing an image of the object in a data array format of data elements;

means responsive to said stored data in said reference image storing means and said object image storing means for comparing respective overlying portions of said reference image and said object image on a data element by data element basis at a predetermined number of shifted positions of said reference image with respect to said object image to obtain the correlation between said data at said shifted positions; and deviation detecting means for determining the shifted position at which the maximum correlation is obtained between said reference image and said object image, said shifted position at which the maximum correlation is obtained representing the deviation between said reference position and said object position, said deviation detecting means being responsive to said comparing means, said comparing means comprising means for serially reading out said reference image data and for serially reading out said object image data bit by bit, and shift register means having a plurality of stages for successively shifting data received at a data input, said read out reference image data being connected to said data input and said shift register means performing a data shift upon the occurrence of each serial data bit at said data input, said comparing means further comprising correlation accumulating means responsive to the data in said plurality of stages of said shift register means and having an object data input connected to said serially read out object information data for accumulating a count representing the correlation between said compared reference image and said object image at each of said predetermined number of shifted positions.

65. A method for determining the shifted positions of a reference image with respect to an object image that results in the maximum correlation, each of the reference and object images being arranged in a respective data array format of data elements, the maximum correlation being defined by the accumulated data element by data element comparison of corresponding data elements of overlaid portions of the reference image and the object image, the method comprising the steps of:

serially reading out said reference image data elements and said object image data elements;

shifting and storing said serially read out reference image data elements at a number of shifted outputs equal in number to the desired number of shifted positions in one direction between the reference image and the object image;

comparing in parallel said shifted and stored reference image data elements with each of said serially read out object image data elements;

accumulating the results of the parallel comparisons of said comparing step at each of said shifted outputs; and determining the shifted position that results in the maximum correlation as the number of the shifted output that provides the highest accumulated comparison count.

66. Apparatus for obtaining the positional deviation between the position of an object represented by an object image and the position of an object at a reference position represented by a reference image, the object image and the reference image each being defined by an array of data elements in two dimensions, the reference image array being defined by m columns by n rows of data elements, the object image array being defined by M columns by N rows of data elements, where M is greater than m and N is greater than or equal to n, the apparatus comprising:

object image serial read out means for serially reading out said data elements of said object image;

reference image serial read out means for serially reading out said data elements of said reference image;

parallel output serial shift register means including P stages where P=N−m+1 and being responsive to said reference image serial read out means for providing at the outputs of said P stages said serial read out reference image data elements and for successively shifting said serial read out reference image data as said data is serially presented;

counter means responsive to said object image serial read out means and said parallel output shift register means for accumulating the correlation degree of said object image and reference image data as determined by the comparison of the corresponding data elements of said reference image and said object image for different shifted positions of said reference image and corresponding overlaid portions of said object image, said counter means comprising means for comparing each of said respective outputs of said parallel output serial shift register means with said serial read out object image data elements and accumulating the results of each of said comparisons, the accumulated comparisons of each of said outputs of said parallel output serial shift register means with said serial read out object image data elements corresponding to the total correlation on a data element basis between said reference image array and overlied portions of said object image array at a different predetermined shifted position of said reference image array with respect to said object image array, the shifted position being defined by a shift in columns; and means responsive to said counter means for determining the deviation of the position of the object from said reference position based on the maximum correlation count of said counter means.

67. The apparatus of claim 70 where N is greater than n and further comprising control means for controlling said object image serial read out means and said reference image serial read out means to read out said respective reference image array and said object image array R times during R steps of operation, where R=N−n+1, each of said R steps corresponding to said counter means accumulating the correlation degree for shifted positions of said reference image array with respect to said object image array, the shifted position being defined by a shift in rows for each successive step, said control means further comprising means for starting the read out of object image data elements by said object image serial read out means at a different row for each successive step.

68. A method of detecting any positional deviation between the position of an object represented by an object image and the position of an object at a reference position represented by a reference image, the object image and the reference image each being defined by an array of data elements in tow dimensions, the reference image array being defined by m columns by n rows of data elements, the object image array being defined by M columns by N rows of data elements, where M is greater than m and N is greater than or equal to n, the method comprising the steps of:

- serially reading out said reference image data elements and said object image data elements on a one to one basis in time succession;
- accumulating the correlation between said reference image array and said object image array corresponding to a predetermined number of shifted positions of said reference image array with respect to said object image array in a first direction by comparing said serially read out image data elements and said object image data elements, the correlation being defined and accumulated by the sum of all individual comparisons of corresponding overlaid data elements of said reference image array and said object image array at each of said shifted positions; and
- determining the shifted position at which the maximum correlation is obtained between said reference image array and said object image array over said predetermined number of shifted positions,
- said accumulating step including the step of serially shifting each serially read out reference imag data element through a plural stage register, the number of stages being equal to the number of shifted positions for which the correlation is obtained, the correlation for each shifted position in the accumulating step being accomplished by the step of summing the comparisons of the data contents of a respective register of said plural stage register with the serial read out object image data element, said shifting step through said plural stage register occurring on a one for one basis with said serial reading out of each reference image data element, said reference image data and said object image data being read out once for the accumulation of the correlation for said predetermined number of shifted positions.

69. The method of claim 68 wherein N is greater than n and further comprising the step of repeating said serially reading out step a number of times equal to the number of shifted positions in a second direction for which correlation is obtained between said reference image array and said object image array, each of said serial reading out steps starting at the same point of said reference image array and at a different point of said object image array, said determining step determining the shifted position at which the maximum correlation is obtained by comparing the correlation for all shifted positions in said first and second directions.

70. Apparatus for determining the shifted position of a reference image with respect to an object image that results in the maximum correlation, each of the reference and object images being arranged in a respective data array format of data elements, the maximum correlation being defined by the accumulated data element by data element comparison of corresponding data elements of overlaid portions of the reference image and the object image, the apparatus comprising:

- means for serially reading out said reference image data elements and said object image data elements;
- means for shifting and storing said serially read out reference image data elements at a number of shifted outputs equal in number to the desired number of shifted positions in one direction between the reference image and the object image;
- means for comparing in parallel said shifted and stored reference image data elements with each of said serially read out object image data elements;
- means for accumulating the results of the parallel comparisons at each of said shifted outputs; and
- means for determining the shifted position that results in the maximum correlation as the number of the shifted output that provides the highest accumulated comparison count.

* * * * *